US012634534B2

(12) United States Patent
Lee et al.

(10) Patent No.: US 12,634,534 B2
(45) Date of Patent: May 19, 2026

(54) ELECTRONIC DEVICE AND OPERATION METHOD THEREOF

(71) Applicant: SAMSUNG ELECTRONICS CO., LTD., Suwon-si (KR)

(72) Inventors: Jongin Lee, Suwon-si (KR); Sehyun Kim, Suwon-si (KR); Kilsoo Choi, Suwon-si (KR); Jiwon Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/124,188

(22) Filed: Mar. 21, 2023

(65) Prior Publication Data

US 2023/0224521 A1     Jul. 13, 2023

Related U.S. Application Data

(63) Continuation of application No. PCT/KR2021/012321, filed on Sep. 10, 2021.

(30) Foreign Application Priority Data

Sep. 21, 2020     (KR) ........................ 10-2020-0121799

(51) Int. Cl.
  *H04N 21/2385*     (2011.01)
  *H04N 21/262*     (2011.01)
(52) U.S. Cl.
  CPC ... *H04N 21/2385* (2013.01); *H04N 21/26216* (2013.01)
(58) Field of Classification Search
  CPC ......... H04N 21/2385; H04N 21/26216; H04N 21/43072
  See application file for complete search history.

(56) References Cited

U.S. PATENT DOCUMENTS 8,532,171  B1 *   9/2013  Narayanan ....... H04N 21/21805
                                              375/240.01
8,855,189  B1 *  10/2014  Krause .................. G06F 16/738
                                              707/636

(Continued)

FOREIGN PATENT DOCUMENTS

CN        102724491 A     10/2012
EP          4297416 A1 *  12/2023   ......... H04N 21/6587

(Continued)

OTHER PUBLICATIONS

International Search Report issued in International Application No. PCT/KR2021/012321 dated Dec. 16, 2021.

(Continued)

*Primary Examiner* — James R Sheleheda
(74) *Attorney, Agent, or Firm* — STAAS & HALSEY LLP

(57)     ABSTRACT

An operating method of an electronic apparatus includes receiving multi-streams that include a first to N-th streams in a descending order of priority, obtaining multi-content corresponding to the multi-streams, and outputting the multi-content in a multi-view mode so that the multi-content corresponding to the multi-streams is respectively output to a plurality of partial screens. The receiving of the multi-streams includes determining a bit rate of each of the multi-streams according to priorities among the multi-streams and buffering each stream at the determined bit rate, and the multi-streams include a main stream having a higher priority and one or more sub-streams having a lower priority than the main stream.

13 Claims, 17 Drawing Sheets

(56) References Cited

U.S. PATENT DOCUMENTS

| | | | |
|---|---|---|---|
| 8,891,619 B2 | 11/2014 | Leontaris et al. | |
| 8,984,561 B2 | 3/2015 | Lee et al. | |
| 9,294,526 B2 | 3/2016 | George et al. | |
| 10,070,186 B1* | 9/2018 | Prestigiacomo | ... H04N 21/4316 |
| 10,097,883 B1* | 10/2018 | Rasool | ............ H04N 21/42215 |
| 10,419,507 B2 | 9/2019 | Taibi et al. | |
| 10,743,004 B1* | 8/2020 | Waggoner | ............ H04L 65/611 |
| 10,951,954 B2 | 3/2021 | Hui | |
| 10,957,360 B1* | 3/2021 | Hastings | ................ G06V 20/46 |
| 11,094,346 B2 | 8/2021 | Sharma et al. | |
| 2003/0018972 A1* | 1/2003 | Arora | ................. H04N 21/4667 |
| | | | 725/47 |
| 2003/0020671 A1* | 1/2003 | Santoro | .................... G09G 5/14 |
| | | | 345/1.3 |
| 2003/0088646 A1* | 5/2003 | Yeo | ......................... G06F 16/54 |
| | | | 348/E7.071 |
| 2003/0161302 A1* | 8/2003 | Zimmermann | ..... H04L 47/6225 |
| | | | 370/363 |
| 2004/0184523 A1* | 9/2004 | Dawson | ............. H04N 21/6377 |
| | | | 348/E7.071 |
| 2005/0114901 A1* | 5/2005 | Yui | ...................... H04N 21/434 |
| | | | 348/E5.002 |
| 2005/0175085 A1* | 8/2005 | Bergen | ............ H04N 21/64792 |
| | | | 375/240 |
| 2005/0276282 A1* | 12/2005 | Wells | ................. H04N 21/4341 |
| | | | 370/503 |
| 2006/0085828 A1* | 4/2006 | Dureau | .................. H04N 7/163 |
| | | | 725/38 |
| 2006/0215630 A1* | 9/2006 | Hwang | ................. H04L 65/756 |
| | | | 370/351 |
| 2007/0143493 A1* | 6/2007 | Mullig | ................. H04L 65/752 |
| | | | 709/232 |
| 2007/0266170 A1* | 11/2007 | Mockett | ............. H04N 21/6405 |
| | | | 709/231 |
| 2008/0256272 A1* | 10/2008 | Kampmann | ........ H04L 47/2416 |
| | | | 710/57 |
| 2009/0060458 A1* | 3/2009 | Bauchot | ......... H04N 21/234318 |
| | | | 386/E5.037 |
| 2010/0040151 A1* | 2/2010 | Garrett | .................... H04N 19/44 |
| | | | 375/240.25 |
| 2010/0235857 A1* | 9/2010 | Lestage | ................ G11B 27/036 |
| | | | 348/E5.062 |
| 2011/0161485 A1* | 6/2011 | George | ................... H04L 43/16 |
| | | | 709/224 |
| 2011/0182366 A1* | 7/2011 | Frojdh | ............... H04N 21/6587 |
| | | | 375/240.26 |
| 2012/0179834 A1* | 7/2012 | van der Schaar | ........................... |
| | | | H04N 21/23439 |
| | | | 709/231 |
| 2012/0183040 A1 | 7/2012 | Fang et al. | |
| 2013/0070839 A1 | 3/2013 | Magee | |

| | | | |
|---|---|---|---|
| 2014/0189772 A1* | 7/2014 | Yamagishi | ....... H04N 21/21805 |
| | | | 725/116 |
| 2015/0134784 A1* | 5/2015 | De Vleeschauwer | ...................... |
| | | | H04N 21/234327 |
| | | | 709/219 |
| 2015/0143239 A1 | 5/2015 | Birkbeck et al. | |
| 2015/0346832 A1* | 12/2015 | Cole | .................... H04N 13/243 |
| | | | 345/156 |
| 2016/0156949 A1* | 6/2016 | Hattori | ............ H04N 21/23439 |
| | | | 725/109 |
| 2016/0182834 A1* | 6/2016 | Sivasankaran | ....... H04N 21/482 |
| | | | 386/230 |
| 2016/0353118 A1* | 12/2016 | Zhang | .................... H04N 19/85 |
| 2017/0359612 A1* | 12/2017 | Kuplevakhsky | ..... H04N 21/631 |
| 2018/0041809 A1* | 2/2018 | Chang | ................... H04L 65/613 |
| 2018/0351868 A1* | 12/2018 | Cartwright | ............ H04L 47/125 |
| 2018/0352049 A1* | 12/2018 | Jeong | ................. H04N 21/4347 |
| 2019/0253742 A1* | 8/2019 | Garten | ................. H04N 21/251 |
| 2020/0236441 A1 | 7/2020 | Moon et al. | |
| 2020/0251047 A1 | 8/2020 | Im et al. | |
| 2021/0084254 A1* | 3/2021 | Lowry | ............. H04N 21/21805 |
| 2023/0088988 A1* | 3/2023 | Krishnamoorthi | .......................... |
| | | | H04N 21/4884 |
| | | | 725/46 |
| 2023/0199267 A1* | 6/2023 | Hyun | ................. H04N 21/8456 |
| | | | 725/116 |
| 2023/0224521 A1* | 7/2023 | Lee | .................. H04N 21/26216 |
| | | | 725/145 |

FOREIGN PATENT DOCUMENTS

| | | | | |
|---|---|---|---|---|
| KR | 10-0601934 | 7/2006 | | |
| KR | 10-2013-0127639 | 11/2013 | | |
| KR | 10-2015-0006302 | 1/2015 | | |
| KR | 10-2015-0091534 | 8/2015 | | |
| KR | 10-1634558 | 6/2016 | | |
| KR | 10-2016-0077077 | 7/2016 | | |
| KR | 10-2018-0124603 | 11/2018 | | |
| KR | 10-2019-0022514 | 3/2019 | | |
| KR | 10-2019-0037868 | 4/2019 | | |
| KR | 10-2020-0091188 | 7/2020 | | |
| WO | WO-2016016688 A1 * | 2/2016 | ....... H04N 21/44222 |
| WO | WO-2016202886 A1 * | 12/2016 | ......... H04N 21/4331 |

OTHER PUBLICATIONS

Written Opinion issued in International Application No. PCT/KR2021/012321 dated Dec. 16, 2021.
Korean Office Action issued on May 19, 2025 for Application No. 10-2020-0121799.
Korean Office Action issued Dec. 1, 2025 for Application No. 10-2020-0121799.

* cited by examiner

Figure 6:
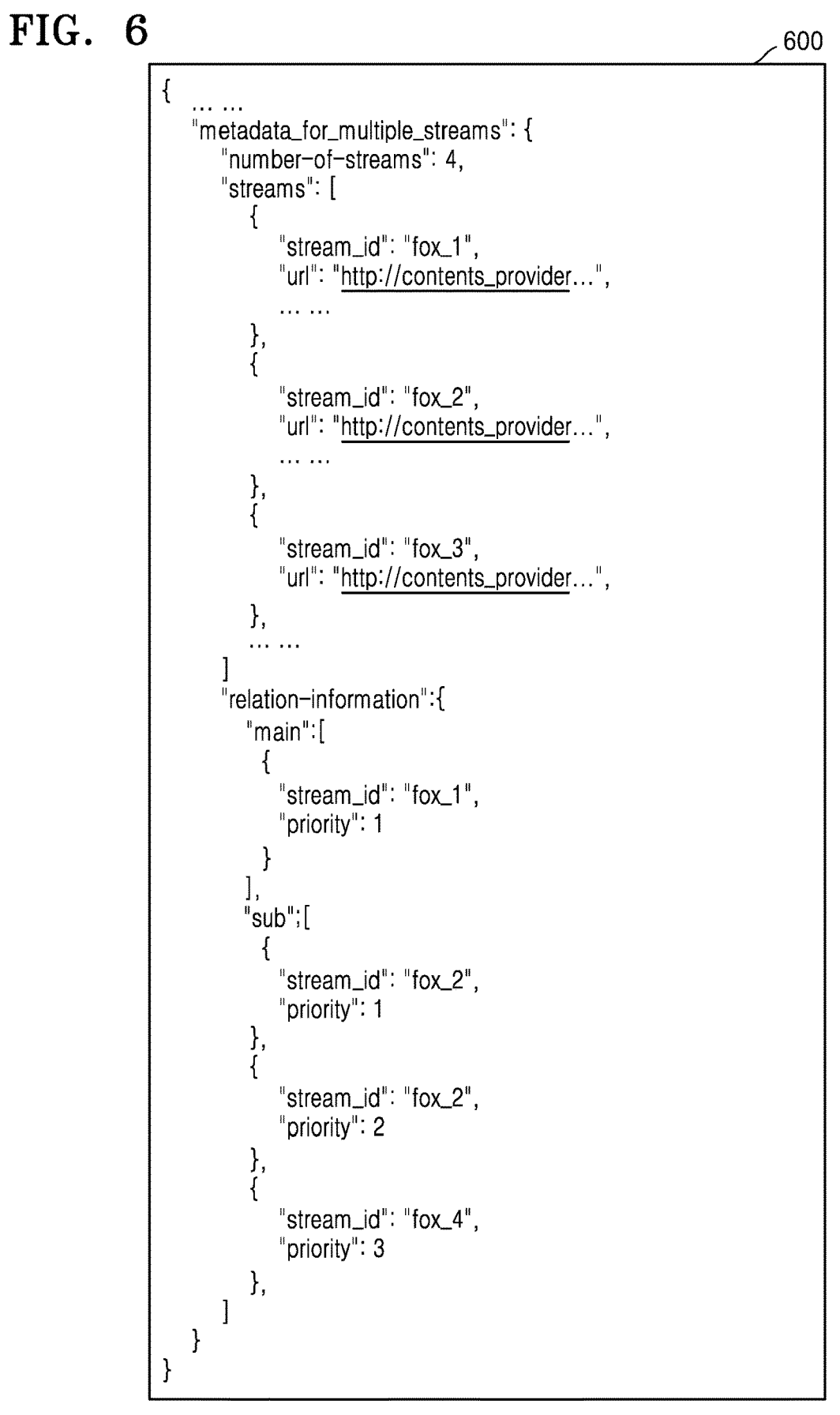

FIG. 6                                                          600

```
{
    ... ...
    "metadata_for_multiple_streams": {
        "number-of-streams": 4,
        "streams": [
            {
                "stream_id": "fox_1",
                "url": "http://contents_provider...",
                ... ...
            },
            {
                "stream_id": "fox_2",
                "url": "http://contents_provider...",
                ... ...
            },
            {
                "stream_id": "fox_3",
                "url": "http://contents_provider...",
            },
            ... ...
        ]
        "relation-information":{
            "main":[
                {
                    "stream_id": "fox_1",
                    "priority": 1
                }
            ],
            "sub";[
                {
                    "stream_id": "fox_2",
                    "priority": 1
                },
                {
                    "stream_id": "fox_2",
                    "priority": 2
                },
                {
                    "stream_id": "fox_4",
                    "priority": 3
                },
            ]
        }
    }
}
```

FIG. 7
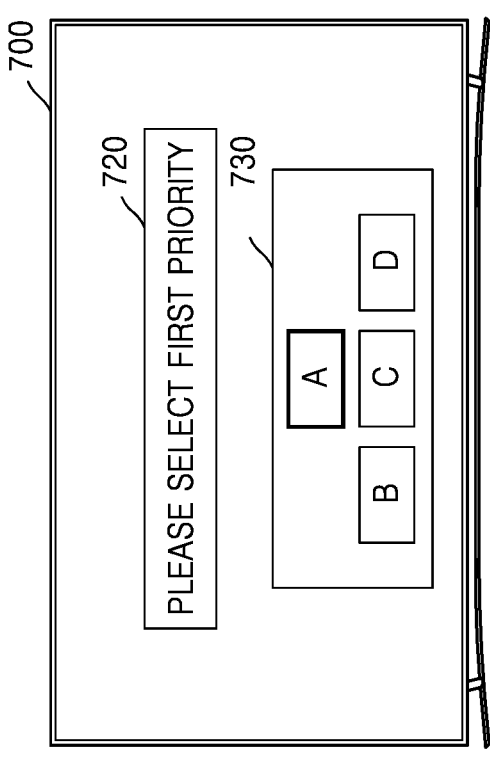
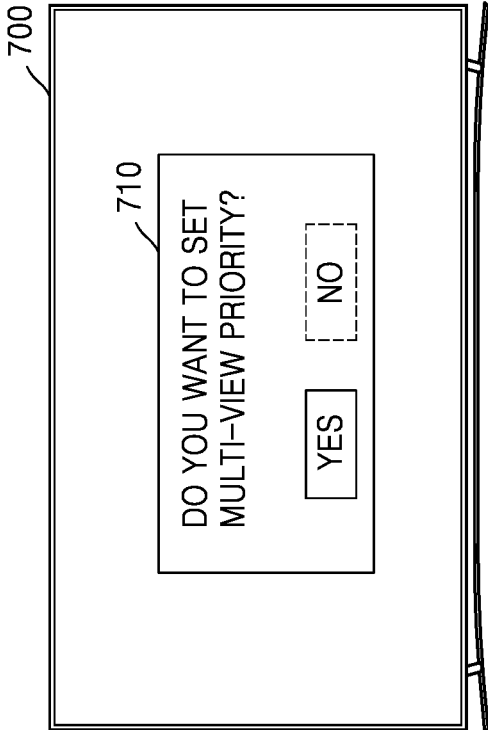

FIG. 11

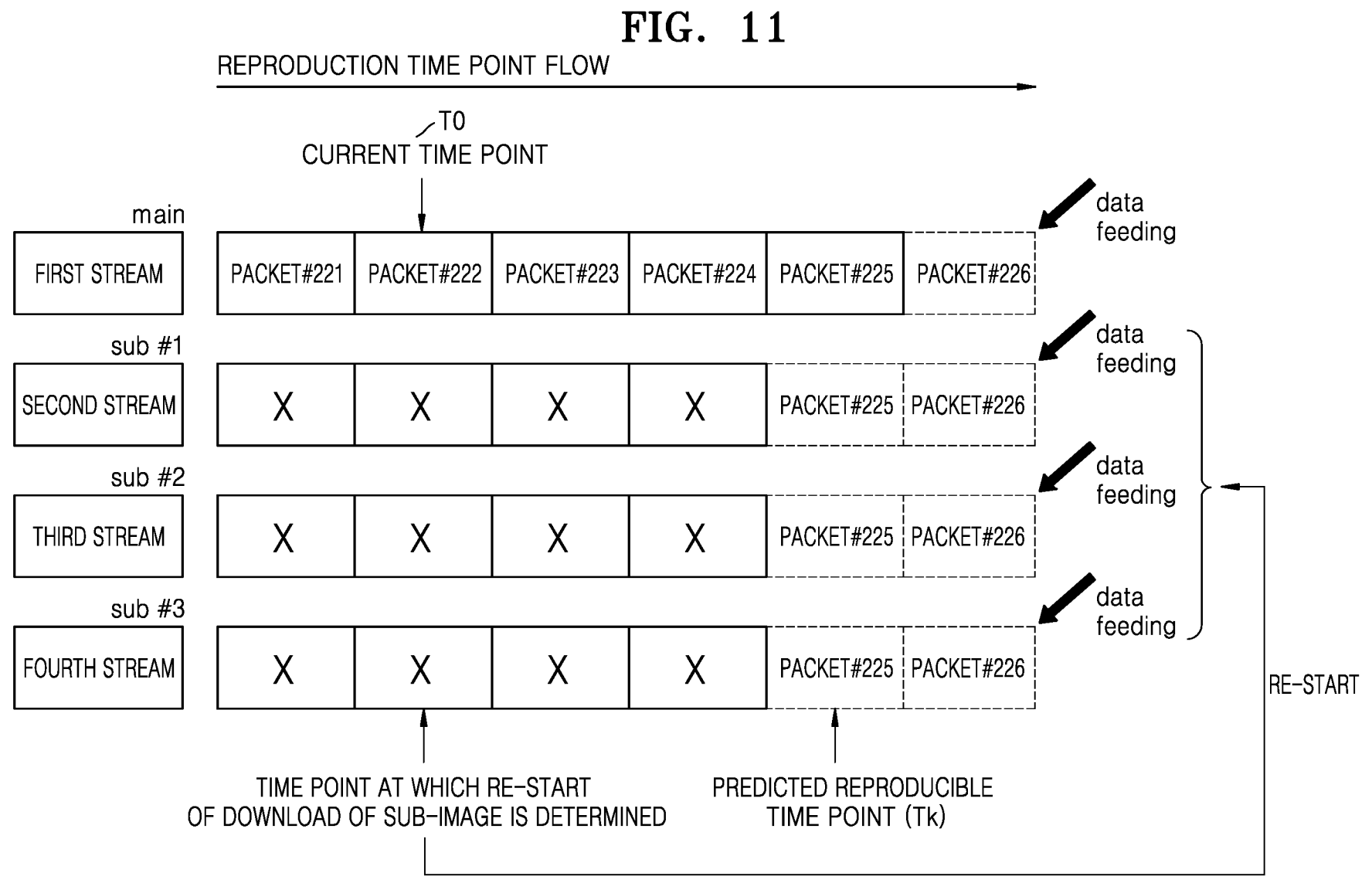

REPRODUCTION TIME POINT FLOW

CURRENT TIME POINT

T0 main

FIRST STREAM

| PACKET#221 | PACKET#222 | PACKET#223 | PACKET#224 | PACKET#225 | PACKET#226 | sub #1

SECOND STREAM

| X | X | X | X | PACKET#225 | PACKET#226 | sub #2

THIRD STREAM

| X | X | X | X | PACKET#225 | PACKET#226 | sub #3

FOURTH STREAM

| X | X | X | X | PACKET#225 | PACKET#226 | data feeding

RE-START

PREDICTED REPRODUCIBLE TIME POINT (Tk)

TIME POINT AT WHICH RE-START OF DOWNLOAD OF SUB-IMAGE IS DETERMINED

ELECTRONIC DEVICE AND OPERATION METHOD THEREOF

CROSS-REFERENCE TO RELATED APPLICATION

This application is a continuation application, under 35 U.S.C. § 111(a), of international application No. PCT/KR2021/012321, filed on Sep. 10, 2021, which claims priority under 35 U.S.C. § 119 to Korean Patent Application No. 10-2020-0121799, filed on 10-2020-0121799, the disclosures of which are incorporated herein by reference in their entirety.

BACKGROUND

Field

Various embodiments described herein relate to an electronic apparatus and an operating method thereof, and more particularly, to an electronic apparatus for streaming multi-streams by considering the relationship between the multi-streams, and an operating method of the electronic apparatus.

Description of Related Art

Multi-streaming technology has been developed. Multi-streaming technology may refer to a technology of outputting multi-content obtained from multi-streams, together on a screen of a display apparatus.

In order to implement the multi-streaming technology, the display apparatus may have to receive multi-streams from a server. Depending on circumstances, when the network bandwidth of the display apparatus is not large enough to stream all of the multi-streams, buffering of all of the multi-streams may be delayed.

SUMMARY

According to an embodiment, an operating method of an electronic apparatus includes receiving multi-streams that include a first to N-th streams in a descending order of priority, the multi-streams being received according to adaptive streaming that is performed to thereby allocate network bandwidth in the descending order of priority based on priorities related to the multi-streams, respectively, N being a natural number equal to or greater than 2, obtaining multi-content corresponding to the multi-streams, and outputting the multi-content in a multi-view mode so that the multi-content corresponding to the multi-streams is respectively output to a plurality of partial screens.

BRIEF DESCRIPTION OF DRAWINGS

FIG. 6 is a diagram for describing priority identification information in multi-streams, according to an embodiment.

FIG. 7 is a diagram for describing receiving an input of priority identification information from a user, according to an embodiment.

FIG. 11 is a diagram for describing an electronic apparatus managing buffering of multi-streams, according to an embodiment.

DETAILED DESCRIPTION OF EXEMPLARY EMBODIMENTS

Figure 1:
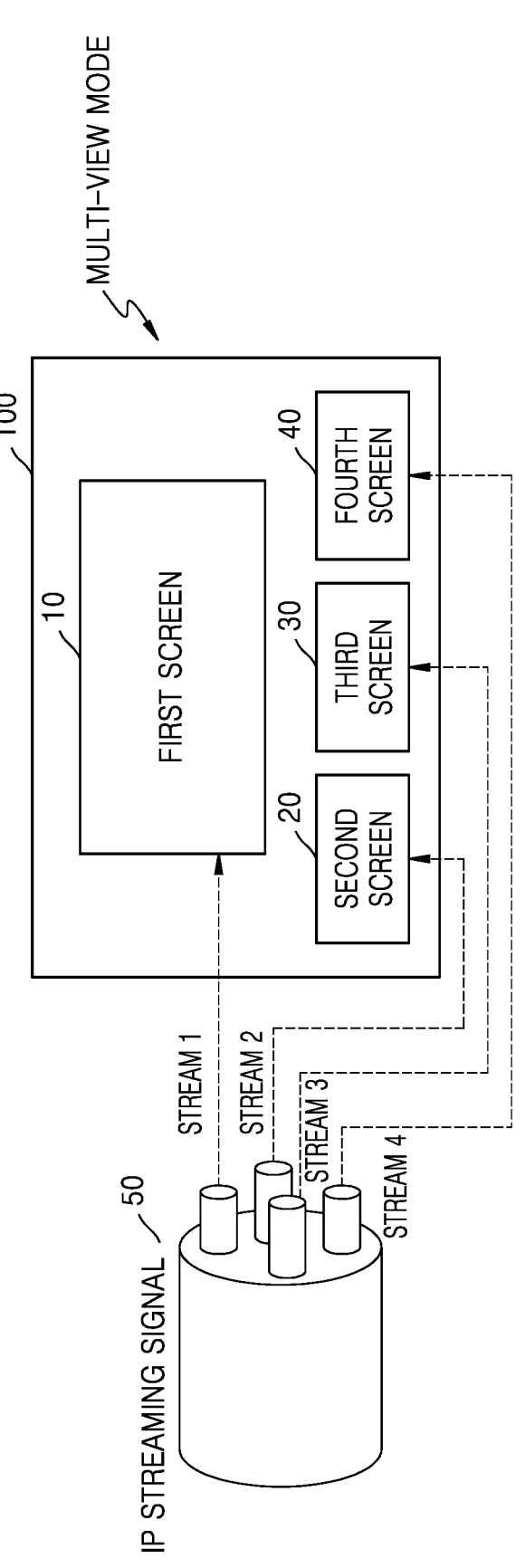
FIG. 1 is a diagram for describing an electronic apparatus operating in a multi-view mode, according to an embodiment.

In an embodiment, the operating method may further include obtaining additional information about each stream, wherein the additional information may include priority identification information representing priorities among the multi-streams.

In an embodiment, the operating method may further include receiving an input of priority identification information through a user interface.

In an embodiment, the performing of the adaptive streaming may include buffering each stream based on a state of the network bandwidth, a space of a buffer receiving each stream, and a bit rate of each stream, and the buffering may include buffering a stream with a next priority based on occurrence of an underflow not being predicted in a buffer receiving a stream with a higher priority.

In an embodiment, the buffering may include first buffering the stream with the higher priority, and sequentially buffering the stream with the next priority after the buffering of the stream with the higher priority is completed.

In an embodiment, the buffering may include, when occurrence of an underflow is not predicted in a buffer receiving each of first to K-th (where K is a natural number greater than or equal to 2 and less than N) streams and occurrence of an underflow is predicted in a buffer receiving a (K+1)th stream, simultaneously buffering the first to K-th streams.

In an embodiment, the performing of the adaptive streaming may further include not performing buffering from the stream with the next priority based on occurrence of an underflow being predicted in the buffer receiving the stream with the higher priority.

In an embodiment, the performing of the adaptive streaming may further include re-buffering the stream with the next priority based on an amount of data in the buffer receiving the stream with the higher priority being predicted to be greater than or equal to a certain value.

In an embodiment, the buffering of the stream with the next priority may include predicting a time point at which the buffering of the stream with the next priority is to be completed, identifying a packet to be reproduced at the predicted time point among packets of the first stream, and performing buffering from a packet of the stream with the next priority to be output in synchronization with the identified packet.

In an embodiment, the outputting of the multi-content in multi-view may include obtaining a time point at which the multi-content is to be reproduced in synchronization with each other, and adjusting a reproduction speed of content obtained from a stream having a next priority and synchronizing and reproducing the content with content obtained from the first stream, from the time point at which the multi-content is to be reproduced, and the synchronizing and reproducing may include, when a reproduction speed of the stream with the next priority is lower than a reproduction speed of the first stream, performing buffering while dropping a packet of the slower stream or a frame of the content obtained from the first stream, and when the reproduction speed of the stream with the next priority is higher than the reproduction speed of the first stream, reading a packet of the faster stream slowly from a buffer.

According to an embodiment, an electronic apparatus includes a streamer, a display, a memory storing one or more instructions, and a processor configured to execute the one or more instructions stored in the memory, wherein the processor is configured to, by executing the one or more instructions, obtain multi-content from each of multi-streams received through the streamer and control the display such that the multi-content is output in multi-view by using a plurality of partial screens, the streamer is configured to perform adaptive streaming on the multi-streams in consideration of priorities among the multi-streams by allocating network bandwidth in descending order of priority of the multi-streams, and the multi-streams comprise first to N-th (where N is a natural number equal to or greater than 2) streams in the descending order of priority.

According to an embodiment, a computer-readable recording medium has recorded thereon a program for implementing an operating method of an electronic apparatus, the operating method including receiving multi-streams, obtaining multi-content from each of the multi-streams, and outputting the multi-content in multi-view by using a plurality of partial screens, wherein the receiving of the multi-streams includes performing adaptive streaming on the multi-streams in consideration of priorities among the multi-streams by allocating network bandwidth in descending order of priority of the multi-streams, and the multi-streams include first to N-th (where N is a natural number equal to or greater than 2) streams in the descending order of priority.

Hereinafter, embodiments of the present disclosure will be described in detail with reference to the accompanying drawings so that those of ordinary skill in the art may easily implement the embodiments of the present disclosure. However, the present disclosure may be embodied in many different forms and should not be construed as being limited to the embodiments set forth herein.

The terms used herein are those general terms currently used in the art in consideration of functions in the present disclosure, but the terms may vary according to the intentions of those of ordinary skill in the art, precedents, or new technology in the art. Thus, the terms used herein should be understood not as simple names but based on the meanings of the terms and the overall description of the present disclosure.

Also, the terms used herein are only used to describe particular embodiments and are not intended to limit the present disclosure.

Throughout the specification, when an element is referred to as being "connected" to another element, it may be "directly connected" to the other element or may be "electrically connected" to the other element with one or more intervening elements therebetween.

As used herein particularly in the claims, "the" or the like may refer to both the singular and the plural. Also, when there is no description explicitly specifying the order of operations described in a method according to the present disclosure, the described operations may be performed in a suitable order. The scope of the present disclosure is not limited to the described operation order.

Phrases such as "in some embodiments" or "in an embodiment" appearing in various places in the specification do not necessarily all refer to the same embodiment.

Some embodiments of the present disclosure may be represented by functional blocks and various processing operations. Some or all of these functional blocks may be implemented by any number of hardware and/or software components that execute particular functions. For example, the functional blocks of the present disclosure may be implemented by one or more microprocessors or may be implemented by circuit components for a certain function. Also, for example, the functional blocks of the present disclosure may be implemented in various programming or scripting languages. The functional blocks may be implemented as an algorithm executed in one or more processors. Also, the present disclosure may employ the related art for electronic environment setting, signal processing, and/or data processing. Terms such as "mechanism," "element," "unit," and "component" may be widely used and are not limited to mechanical and physical components.

Also, the connection lines or connection members between the elements illustrated in the drawings are merely examples of functional connections and/or physical or logical connections. In an actual apparatus, the connections between elements may be represented by various functional connections, physical connections, or logical connections that are replaceable or added.

Also, as used herein, the terms such as "units" and "modules" may refer to units that perform at least one function or operation, and the units may be implemented as hardware or software or a combination of hardware and software.

As used herein, the term "user" may refer to a person controlling the function or operation of an electronic apparatus by using an electronic apparatus and may include a viewer, a consumer, a manager, or an installer.

Hereinafter, the present disclosure will be described in detail with reference to the accompanying drawings.

FIG. 1 is a diagram for describing that an electronic apparatus operates in a multi-view mode, according to an embodiment.

Referring to FIG. 1, an electronic apparatus 100 may output content. In an embodiment, the electronic apparatus 100 may be a display apparatus such as a television capable of outputting content on a screen.

In an embodiment, the electronic apparatus 100 may provide a multi-streaming service in order to provide the users with more various content experiences. The multi-streaming service may refer to a service in which the electronic apparatus 100 receives multi-streams and processes the received multi-streams to provide different pieces of content in a plurality of areas of the display screen. The multi-streaming service may be referred to as a multi-view service or a multi-screen service.

The electronic apparatus 100 may divide the display into a plurality of screens and display different pieces of content on the plurality of screens to provide content in the multi-view mode. In the multi-view mode, each of the plurality of screens of the display may also be referred to as a partial screen.

The content displayed in the multi-view mode may include one or more of broadcast content directly received as an RF signal from a broadcasting station, broadcast content received through an external source, and content received from a content providing server through the Internet.

Content signals provided to a plurality of screens in the multi-view mode may be obtained from multi-streams included in an IP streaming signal 50. In this case, a plurality of multi-streams may be transmitted from the same server, or only some of the plurality of multi-streams may be transmitted from the same server and the other streams may be transmitted from a separate server.

An OTT service provider or an IPTV service provider may provide various pieces of content to the consumer by using an Internet protocol over a broadband connection. These service providers may provide a streaming service such that the consumer may use live broadcast in real time or may provide a video-on-demand (VOD) service such that the consumer may receive and use a stream corresponding to desired content at a desired time in a streaming or downloading manner. Hereinafter, a terrestrial broadcasting station, a cable broadcasting station, an OTT service provider, or an IPTV service provider that provides content to the consumer will be referred to as a content provider.

The electronic apparatus 100 may receive a plurality of pieces of content from the content provider in the form of a multi-stream, process the content, and output the processed content on the screen. In an embodiment, the content may include an item such as various movies or dramas provided by the content providers through a streaming server or a VOD server and may include one or more of a video signal, an audio signal, and a text signal.

The content provider may generate multi-streams respectively corresponding to a plurality of pieces of content to be output in the multi-view mode.

When a plurality of pieces of content are live signals, the content provider may live transmit streams corresponding to the content to the streaming server. The streaming server may simultaneously transmit the live signals to the electronic apparatus 100 while storing the live signals in real time. For multi-view viewing in real time, when the electronic apparatus 100 requests content from the streaming server, the streaming server may transmit multi-streams corresponding to a plurality of pieces of content to the electronic apparatus 100.

The content provider may store a plurality of pieces of content in the VOD server. The VOD server may store pre-generated streams and transmit the same to the electronic apparatus 100 according to the user's request.

Various numbers of screens may be provided in the multi-view mode. The number of partial screens provided in the multi-view mode may be two, three, four, or more. FIG. 1 illustrates that four partial screens are provided as an example. Referring to FIG. 1, the multi-view mode may include a first screen 10, a second screen 20, a third screen 30, and a fourth screen 40.

In FIG. 1, the multi-streams may include streams 1 to 4. First content may be obtained from stream 1 and the first content may be displayed through the first screen 10. Similarly, second content obtained from stream 2 may be displayed through the second screen 20, third content obtained from stream 3 may be displayed through the third screen 30, and fourth content obtained from stream 4 may be displayed through the fourth screen 40.

The plurality of screens provided in the multi-view mode may be variously arranged. As an example, FIG. 1 illustrates that one screen is arranged in the upper center portion of the display and three screens are arranged side by side in the lower portion of the display.

The sizes of the plurality of screens provided in the multi-view mode may be variously determined. The sizes of the plurality of partial screens may all be equal to each other or may be different from each other.

The plurality of pieces of content output together in multi-view may be pieces of content associated with each other. The plurality of pieces of content may be generated by capturing one event at different angles, in different directions, in different places, or the like.

For example, when a sports game such as baseball is output on the screen of the electronic apparatus 100, content displayed on the plurality of partial screens in the multi-view mode may be content corresponding to a plurality of scenes that may be captured in the sports game. For example, each partial screen of the multi-view mode may display batter-centered content, catcher-centered content, manager-centered content, or spectator-centered content. As another example, in the case of content broadcasting a performance, each partial screen of the multi-view mode may display content centered on each performer performing or playing in the performance.

In an embodiment, the content provider may set the most important content among the plurality of pieces of content as main content. The main content may be the content that is most requested to be seamlessly reproduced among the plurality of pieces of content. For example, when generating a plurality of pieces of content for a sports game, the content provider may determine that the content of a game scene is more important than the content of a scene for a manager or spectator. In this case, the content provider may set the content of the game scene as the main content.

Alternatively, the content provider may set the content that is a standard for synchronizing other pieces of content, among the plurality of pieces of content as the main content. The content provider may set the content to be reproduced in synchronization with the main content, as sub-content. For example, the content provider may determine that the content of a scene for a conductor among the concert scenes should be a synchronization standard when the content of a scene for performers is reproduced. In this case, the content provider may set the content of the conductor as the main content.

Because the main content is the most important content or the content that is a standard for synchronizing other pieces of content, the highest priority may be set with respect thereto in the relationship between the pieces of content.

In some cases, there may be a plurality of pieces of main content. For example, when generating content for a baseball game, the content provider may determine that both the batter-centered content and the catcher-centered content are important and may set both these pieces of content as the main content. In this case, the content provider may also set the priority between the plurality of pieces of main content. For example, the content provider may set the batter-centered content as the main content having a higher priority than the catcher-centered content.

The content provider may set content other than the main content as sub-content. For example, in the above example, the sub-content may include content for the manager's seat, content for the commentator, content for the spectator's seat, or the like.

Alternatively, the sub-content may include content for providing additional information about the main content. For example, the sub-content may include the score of a baseball game, information about a team, and information about baseball players in a broadcast baseball game and may include information about performers and information about a performance product in a broadcast live performance.

The sub-content may be set to have a lower priority than the main content. When there are a plurality of pieces of sub-content, the content provider may also set the priority between the plurality of pieces of sub-content. For example, when the content provider determines that the pieces of sub-content are important in the order of the content for the manager's seat, the content for the commentator, and the content for the spectator's seat, the content provider may assign a second priority to the content for the manager's seat, assign a third priority to the content for the commentator, and assign a fourth priority to the content for the spectator's seat.

In an embodiment, the content provider generating the multi-streams may generate content information including attribute information about the multi-streams. The content information may be a type of metadata including bibliographic data about the multi-streams. The content information may include information about content attributes such as content availability, content type, time, resolution, minimum and maximum bandwidth, a path such as a URL of the stream on a server 200, access characteristics, and digital rights management (DRM). Also, in an embodiment, the content information may include at least one of the number of multi-streams, the identification number of each stream, and the relationship between the streams. The relationship between the streams may include at least one of an identifier indicating whether each stream is a main stream or a sub-stream, an identifier indicating a stream with which a sub-stream is to be synchronized, and information representing the priority of each stream.

Hereinafter, information representing the relationship between the multi-streams will be referred to as priority identification information. Because the content is generated by decoding the stream, the priority identification information may represent not only the priority between the multi-streams but also the priority between the pieces of multi-content in the same manner.

The content provider may determine the priority of each of the plurality of pieces of content/streams and generate the same as priority identification information. The priority identification information may include information representing the priority of each of the plurality of pieces of content/streams.

In an embodiment, the content provider may include the priority identification information in the content information and transmit the same to the electronic apparatus 100.

Alternatively, in an embodiment, the content provider may generate priority identification information representing the priority between the multi-streams as metadata separate from the content information and transmit the same to the electronic apparatus 100 separately from the multi-stream or inclusively in the multi-stream.

For example, the priority identification information may be included in a header of a transport stream and transmitted to the electronic apparatus 100. Alternatively, the priority identification information may be included in a header of a main stream among the multi-streams and transmitted to the electronic apparatus 100.

The electronic apparatus 100 may obtain content information and obtain priority identification information from the content information, or may obtain a priority identifier generated separately from content information from a header of a main stream or a multi-stream and identify the priority of each stream from the priority identifier.

In another embodiment, the priority identification information may be directly set by the user who views the content in the multi-view mode by using the electronic apparatus 100. For example, the electronic apparatus 100 may output an interface screen according to the user's request and directly receive a priority setting between a plurality of streams from the user through the user interface.

The electronic apparatus 100 may receive multi-streams by using an adaptive streaming technology. The adaptive streaming technology may mean streaming data by adjusting a bit rate of content according to the network bandwidth. The content provider may prepare streams encoded at various resolutions such as 480p, 720p, or 1080p for the same image and transmit the stream of the resolution requested by the electronic apparatus 100 to the electronic apparatus 100 according to the network state.

When the network bandwidth is not sufficient to adaptively stream all of the multi-streams, streaming of all of the multi-streams may be delayed or interrupted and thus screen reproduction may be delayed or performed with only low image quality.

According to an embodiment, when receiving multi-streams for multi-view output, the electronic apparatus 100 may stream the multi-streams by considering the priority of each stream.

In an embodiment, the electronic apparatus 100 may perform adaptive streaming by allocating the network bandwidth from the main stream with the higher priority such that the content with the higher priority may be seamlessly output.

Figure 2:
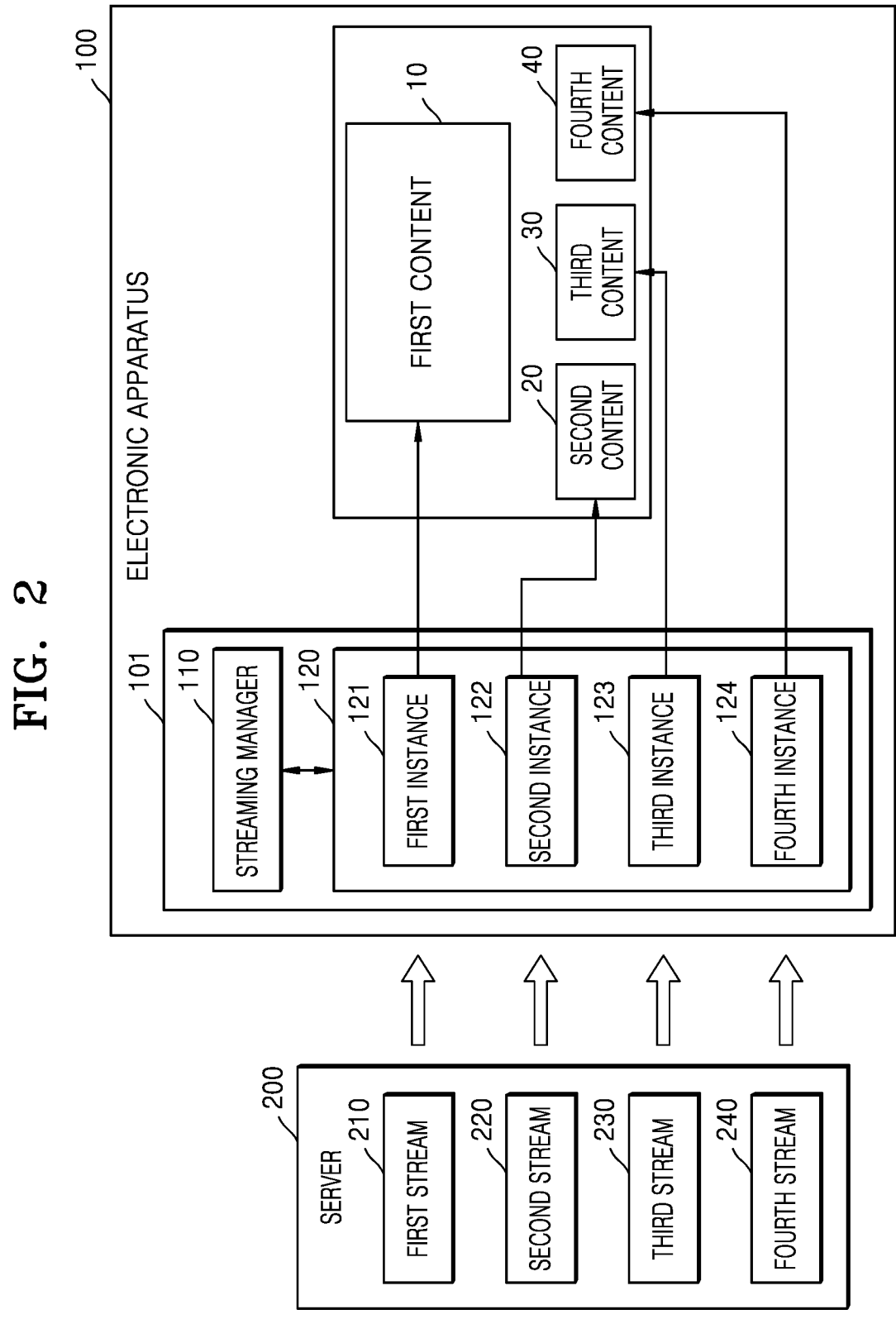
FIG. 2 is a diagram for describing an operation in which an electronic apparatus receives multi-streams from a server in consideration of priority, according to an embodiment.

FIG. 2 is a diagram for describing an operation in which an electronic apparatus receives multi-streams from a server in consideration of priority, according to an embodiment.

Referring to FIG. 2, according to the multi-view mode, the electronic apparatus 100 may display first content, second content, third content, and fourth content through a plurality of screens, that is, a first screen 10, a second screen 20, a third screen 30, and a fourth screen 40, respectively.

The electronic apparatus 100 may include a streamer 101 that performs a function of receiving multi-streams. The streamer 101 may include a streaming module 120 including a plurality of instances 121, 122, 123, 124 and a streaming manager 110 controlling the streaming module 120.

The streaming manager 110 may obtain content information from a server 200. The content information may include information about content attributes such as content availability, content type, time, resolution, minimum and maximum bandwidth, a path such as a URL of the stream on the server 200, access characteristics, and digital rights management (DRM). In an embodiment, the content information may further include at least one of the number of multi-streams provided by the server 200, the identification number of each stream, and the relationship between the streams. The relationship between the streams may refer to priority identification information. That is, the priority identification information may include at least one of an identifier indicating whether each stream is a main stream or a sub-stream, an identifier indicating a stream with which a sub-stream is to be synchronized, and information representing the priority of each stream.

In another embodiment, the streaming manager 110 may obtain the priority identification information from the server 200 separately from the content information. The streaming manager 110 may obtain the priority identification information in the form of metadata or from a header of the multi-stream, a header of the main stream, or the like.

The streaming manager 110 may select a stream with a suitable resolution based on the above information. That is, the streaming manager 110 may select a stream suitable for each of the instances 121, 122, 123, and 124 based on the state of the network bandwidth, the buffer space of each of the instances 121, 122, 123, and 124 receiving each stream, and the bit rate of each stream. The streaming manager 110 may request the server 200 to transmit the selected stream.

Also, the streaming manager 110 may request the server to transmit a stream corresponding to the content as a stream with a higher bit rate or a lower bit rate according to a change in the network bandwidth environment or the environment of the electronic apparatus 100 even while the content is being reproduced.

In an embodiment, not the streaming manager 110 but each of the instances 121, 122, 123, and 124 may directly request a suitable stream from the server 200. Each of the instances 121, 122, 123, and 124 may receive the address of a stream to be processed by each of the instances 121, 122, 123, and 124 from the streaming manager 110, access the server 200 by using the received address, and request the server 200 to transmit a stream with a suitable resolution suitable for each of the instances 121, 122, 123, and 124.

The server 200 may store streams corresponding to a plurality of pieces of content. The server 200 may store streams of different resolutions for each content. For example, the server 200 may store streams of 8K, 4K, and 2K for a first stream 210 corresponding to the first content and may likewise store streams of various resolutions for each of the second to fourth content. When receiving a request for content of a particular resolution from the electronic apparatus 100, the server 200 may provide a stream of a requested resolution to the electronic apparatus 100.

In an embodiment, the streaming manager 110 may control the streaming module 120. The streaming manager 110 may obtain priority identification information representing the priority of each stream and control each of the instances 121, 122, 123, and 124 included in the streaming module 120 by using the priority identification information.

In an embodiment, by considering the priorities among the multi-streams, the streaming manager 110 may control each of the instances 121, 122, 123, and 124 such that the network bandwidth may be allocated from the stream with the higher priority among the multi-streams.

In an embodiment, the streaming manager 110 may calculate a buffer state in each of the instances 121, 122, 123, and 124 by considering the capacity of the buffer included in each of the instances 121, 122, 123, and 124, the amount of data currently filling the buffer, a certain threshold value that is a criterion for occurrence of an underflow in the buffer, a value at which the amount of data in the buffer is greater than or equal to a certain value and thus the amount of data is predicted to be secured at a certain level or more, the bit rate of each stream, or the like. The streaming manager 110 may predict whether an underflow will occur in the buffer included in each of the instances 121, 122, 123, and 124 or whether the amount of data in the buffer is greater than or equal to a certain value.

For example, it is assumed that four pieces of content are to be output in multi-view and four multi-streams are prioritized in the order of a first stream 210, a second stream 220, a third stream 230, and a fourth stream 240. By using the priority identification information, the streaming manager 110 may identify that the first stream 210 has the highest priority, first allocate the network bandwidth to the first stream 210, and control the streaming module 120 such that adaptive streaming may be performed from the first stream 210.

The streaming manager 110 may select the first stream 210 with a suitable resolution based on the available network state of the electronic apparatus 100, the buffer space of the first instance 121 receiving the first stream 210, and/or the bit rate of the first stream 210. The streaming manager 110 may request the server 200 to transmit the first stream 210 with the selected resolution. The server 200 may transmit the first stream 210 of the resolution requested by the streaming manager 110 to the electronic apparatus 100.

The first instance 121 may receive the first stream 210 from the server 200 and obtain the first content from the first stream 210. The first instance 121 may obtain the first content by streaming the first stream 210, decoding the same, and rendering the decoding result. The first content obtained by the first instance 121 may be output through the first screen 10.

Similarly, the streaming manager 110 may select the second stream 220 with a suitable resolution based on the available network state of the electronic apparatus 100, the buffer space of the second instance 122 receiving the second stream 220, and the bit rate of the second stream 220.

In an embodiment, the streaming manager 110 may control the streaming module 120 to perform streaming on the streams having the lower priority among the multi-streams, for example, the second to fourth streams 220 to 240, only when it is predicted that an underflow will not occur in the buffer receiving the first stream 210. That is, the streaming manager 110 may first allocate the network bandwidth to stream the first stream 210 and then may control the streaming module 120 to perform buffering on the second stream 220 only when occurrence of an underflow is not predicted in the buffer receiving the first stream 210 according to the streaming state of the first stream 210.

Also, likewise, the streaming manager 110 may control the streaming module 120 to perform buffering on the third stream 230 only when occurrence of an underflow is not predicted in the buffer receiving the first stream 210 and the second stream 220. When occurrence of an underflow is predicted in the buffer receiving the second stream 220, the streaming manager 110 may control the streaming module 120 not to perform buffering on the third stream 230 and the fourth stream 240.

In an embodiment, when occurrence of an underflow is not predicted in the buffer receiving the first stream 210 and the second stream 220, the streaming manager 110 may control the streaming module 120 to simultaneously buffer the first stream 210 and the second stream 220.

Alternatively, in another embodiment, the streaming manager 110 may control the streaming module 120 to start buffering of the stream with the next priority after completion of buffering on the stream with the higher priority.

The streaming manager 110 may determine whether to perform buffering of each of the streams by continuously considering a change in the network bandwidth environment or the environment of the electronic apparatus 100 even while the content is being reproduced in multi-view. When the state of network bandwidth changes while all of the four streams are buffered by the instances 121, 122, 123, and 124 and output in multi-view, the streaming manager 110 may determine whether an underflow will occur in the buffer receiving each stream.

For example, when occurrence of an underflow is not predicted in the buffer receiving the first stream 210 and the second stream 220 having the higher priority and it is predicted that an underflow will occur after a certain time in the buffer receiving the third stream 230 having the next priority, the streaming manager 110 may control the fourth instance 124 processing the fourth stream 240, to no longer buffer the fourth stream 240 at the existing bit rate. In this case, all of the packets of the fourth stream 240 already downloaded to the buffer may be read and reproduced, but the subsequent packets may not be reproduced. The electronic apparatus 100 may continuously output a screen, which has been last reproduced through the fourth screen 40, or may display the screen in black.

Alternatively, the streaming manager 110 may request a stream of the lower resolution from the server 200 such that the fourth stream 240 may be reproduced at a lower bit rate than before.

Alternatively, the streaming manager 110 may request only an audio stream with a small data capacity in the fourth stream 240 from the server 200 and receive and stream only the audio stream from the server 200.

In the above example, because the first to third streams 210 to 230 are continuously buffered, the first to third content corresponding thereto may be continuously displayed on the screen, whereas because downloading of the fourth stream 240 is stopped, the fourth content may no longer be displayed on the screen from a certain time point. In an embodiment, in a state where buffering of the fourth stream 240 is stopped, by continuously monitoring the first to third instances 121 to 123 processing the first to third streams 210 to 230, the streaming manager 110 may predict whether the amount of data in the buffer belonging to the corresponding instance will be greater than or equal to a certain value. When the amount of data in the buffer is greater than or equal to a certain value, it may mean that the amount of data secured in the buffer is equal to or greater than a reference value.

When the amount of data in the buffer is predicted to be greater than or equal to a certain value in one or more of the buffers receiving the first to third streams 210 to 230, the streaming manager 110 may re-dedicate the remaining network bandwidth to stream the fourth stream 240. That is, the streaming manager 110 may control the fourth instance 124 to re-start buffering on the fourth stream 240.

When the fourth instance 124 re-starts buffering from the point where buffering on the fourth stream is stopped, the content obtained from the first to third streams 210 to 230 and the content obtained from the fourth stream 240 may not be synchronized with each other.

For synchronization between the pieces of content, the streaming manager 110 may predict when buffering of the fourth stream 240 will be completed. The streaming manager 110 may identify a packet to be reproduced at a predicted time point among the packets of the first stream 210 with respect to the first stream 210 having the highest priority. The streaming manager 110 may control the fourth instance 124 to perform buffering from the packet of the fourth stream 240 to be output in synchronization with the identified packet of the first stream 210.

As described above, by considering the capacity of the buffer included in each of the instances 121, 122, 123, and 124, the amount of data currently filling the buffer, a reference value at which the amount of underflow in the buffer or the amount of data in the buffer is predicted to be greater than or equal to a certain value, the bit rate of each stream, or the like, the streaming manager 110 may predict whether an underflow will occur in the buffer included in each of the instances 121, 122, 123, and 124 or how much data will be secured and control each of the instances 121, 122, 123, and 124.

Alternatively, in another embodiment, not the streaming manager 110 but each of the instances 121, 122, 123, and 124 may calculate the amount of data in the buffer included in each of the instances 121, 122, 123, and 124 or the like to predict whether an underflow will occur in the future or whether the amount of data in the buffer will be greater than or equal to a certain value and notify the result thereof to the streaming manager 110 as an event. The streaming manager 110 may receive the event from each of the instances 121, 122, 123, and 124, accordingly determine in which instance buffering will or will not be performed, and control each of the instances 121, 122, 123, and 124.

As such, according to an embodiment, the electronic apparatus 100 may ensure reproduction of the stream with the higher priority by allocating the network bandwidth and performing streaming in descending order of priority by considering the priority of each stream.

Figure 3:
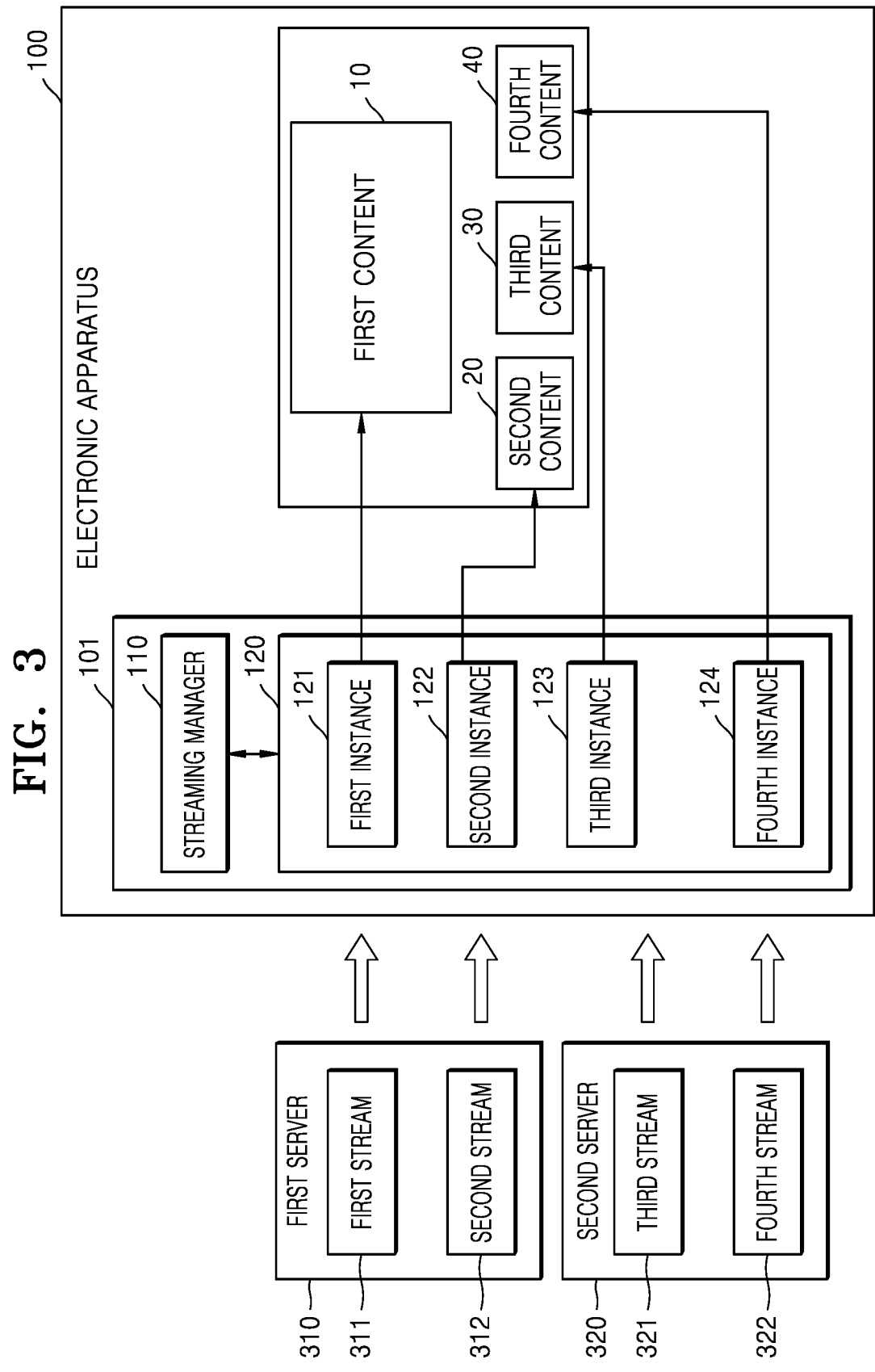
FIG. 3 is a diagram for describing an operation in which an electronic apparatus receives multi-streams from a server in consideration of priority, according to an embodiment.

FIG. 3 is a diagram for describing an operation in which an electronic apparatus receives multi-streams from a server in consideration of priority, according to an embodiment.

Referring to FIG. 3, like in FIG. 2, the electronic apparatus 100 may include a streamer 101 streaming multi-streams. The streamer 101 may include a streaming module 120 including a plurality of instances 121, 122, 123, 124 and a streaming manager 110 controlling the streaming module 120. According to the multi-view mode, the electronic apparatus 100 may display a plurality of pieces of content through a plurality of screens, that is, a first screen 10, a second screen 20, a third screen 30, and a fourth screen 40, respectively.

Hereinafter, redundant descriptions already given with reference to FIG. 2 will be omitted for conciseness.

Unlike in FIG. 2, in FIG. 3, streams for providing a multi-view may be transmitted from different servers. FIG. 3 illustrates that a first server 310 stores a first stream 311 and a second stream 312 corresponding to first content and second content and a second server 320 stores a third stream 321 and a fourth stream 322 corresponding to third content and fourth content.

The first server 310 may transmit content information to the electronic apparatus 100. The electronic apparatus 100 may select a stream with a suitable resolution based on the content information. The first server 310 may store the first content and the second content as streams of different resolutions. For example, the first server 310 may store streams of 8K, 4K, and 2K for the first stream 311 corresponding to the first content and may likewise store streams of various resolutions for the second content. The first server 310 may receive a request for the first content and the second content of a particular resolution from the electronic apparatus 100 and provide the first stream 311 and the second stream 312 of the requested resolution to the electronic apparatus 100.

Similarly, the second server 320 may also transmit content information to the electronic apparatus 100. The electronic apparatus 100 may receive the content information from the second server 320 and request the third stream 321 and the fourth stream 322 having a suitable resolution from the second server 320 based on the received content information. The second server 320 may provide the electronic apparatus 100 with the third stream 321 and the fourth stream 322 having the resolution requested by the electronic apparatus 100.

In an embodiment, through the content information received from the first server 310 and the second server 320, the streaming manager 110 may identify the IP addresses of the first server 310 and the second server 320 to determine whether the two servers 310 and 320 are separated from each other.

When the IP addresses of the two servers 310 and 320 are different from each other, the streaming manager 110 may determine that the two servers 310 and 320 are separated from each other. When determining that the two servers 310 and 320 are separated from each other, the streaming manager 110 may consider the priority only between the streams provided from the same server. The streaming manager 110 may identify the priority between the streams transmitted from the same server, through the content information transmitted from each of the servers 310 and 320, and control each of the instances 121, 122, 123, and 124 to perform streaming from the stream with the highest priority among the multi-streams, according to the identified priority.

Because the network bandwidth is determined between each of the servers 310 and 320 and the electronic apparatus 100, when the servers providing the multi-streams are separated from each other as illustrated in FIG. 3, the network bandwidth between the first server 310 and the electronic apparatus 100 and the network bandwidth between the second server 320 and the electronic apparatus 100 may be independent of each other.

In an embodiment, by considering the priority between the streams transmitted from the same server, the streaming manager 110 may control the streaming module 120 such that the stream having the higher priority may be first streamed. That is, the streaming manager 110 may allocate the network bandwidth from the first stream 311 with the higher priority by considering the priority between the first stream 311 and the second stream 312 transmitted from the first server 310. The streaming manager 110 may determine whether to buffer the second stream 312 by considering the buffering state of the first stream 311.

The streaming manager 110 may request the first stream 311 with a suitable resolution based on the available network state of the electronic apparatus 100, the buffer space of the first instance 121 receiving the first stream 311, and/or the bit rate of the first stream 311 and receive the first stream 311 with the suitable resolution from the first server 310. The first instance 121 may receive the first stream 311 from the first server 310 and obtain the first content from the first stream 311.

The streaming manager 110 may select the second stream 312 with a suitable resolution based on the available network state of the electronic apparatus 100, the buffer space of the second instance 122 receiving the second stream 312, and/or the bit rate of the second stream 312. In an embodiment, the streaming manager 110 may control the second instance 122 such that the second stream 312 may be streamed only when it is predicted that an underflow will not occur in the buffer receiving the first stream 311.

Likewise, when receiving the third stream 321 and the fourth stream 322 from the second server 320, the streaming manager 110 may control the fourth instance 124 to perform buffering on the fourth stream 322 only when occurrence of an underflow is not predicted in the buffer receiving the third stream 321 with the higher priority.

In an embodiment, when occurrence of an underflow is not predicted in each of the buffers receiving the first stream 311 and the second stream 312, the streaming manager 110 may control the streaming module 120 to simultaneously buffer the first stream 311 and the second stream 312. Alternatively, in another embodiment, the streaming manager 110 may control the streaming module 120 to start buffering of the second stream 312 after completion of buffering on the first stream 311 with the higher priority.

The streaming manager 110 may determine whether an underflow will occur in the buffer receiving the first stream 311 by continuously monitoring the state of the network bandwidth or the state of the buffer even while the content is being reproduced in multi-view. In an embodiment, the streaming manager 110 may control the second instance 122 such that the second stream 312 may not be downloaded when occurrence of an underflow is predicted in the buffer receiving the first stream 311.

In this case, all of the packets of the second stream 312 already downloaded to the buffer may be read and reproduced as the second content through the second screen 20, but the subsequent packets may not be reproduced. In an embodiment, the streaming manager 110 may predict whether the first stream 311 will be continuously received or predict whether the amount of data in the buffer will be greater than or equal to a certain value and may control the second instance 122 such that the second stream 312 may be re-buffered when it is predicted that the amount of data secured in the buffer will be greater than or equal to a certain value. In this case, the streaming manager 110 may determine from which packet of the second stream 312 buffering will be started such that the second content obtained from the second stream 312 may be reproduced in synchronization with the first content obtained from the first stream 311. The streaming manager 110 may predict the buffering completion time point of the packets of the second stream 312 and identify a packet to be reproduced at a predicted time point among the packets of the first stream 311. The streaming manager 110 may control the second instance 122 to perform buffering from the packet of the second stream 312 to be output in synchronization with the identified packet of the first stream 311.

As such, according to an embodiment, the electronic apparatus 100 may stream the streams according to the priority between the streams transmitted from the same server by considering whether the servers transmitting the streams are separated from each other.

Figure 4:
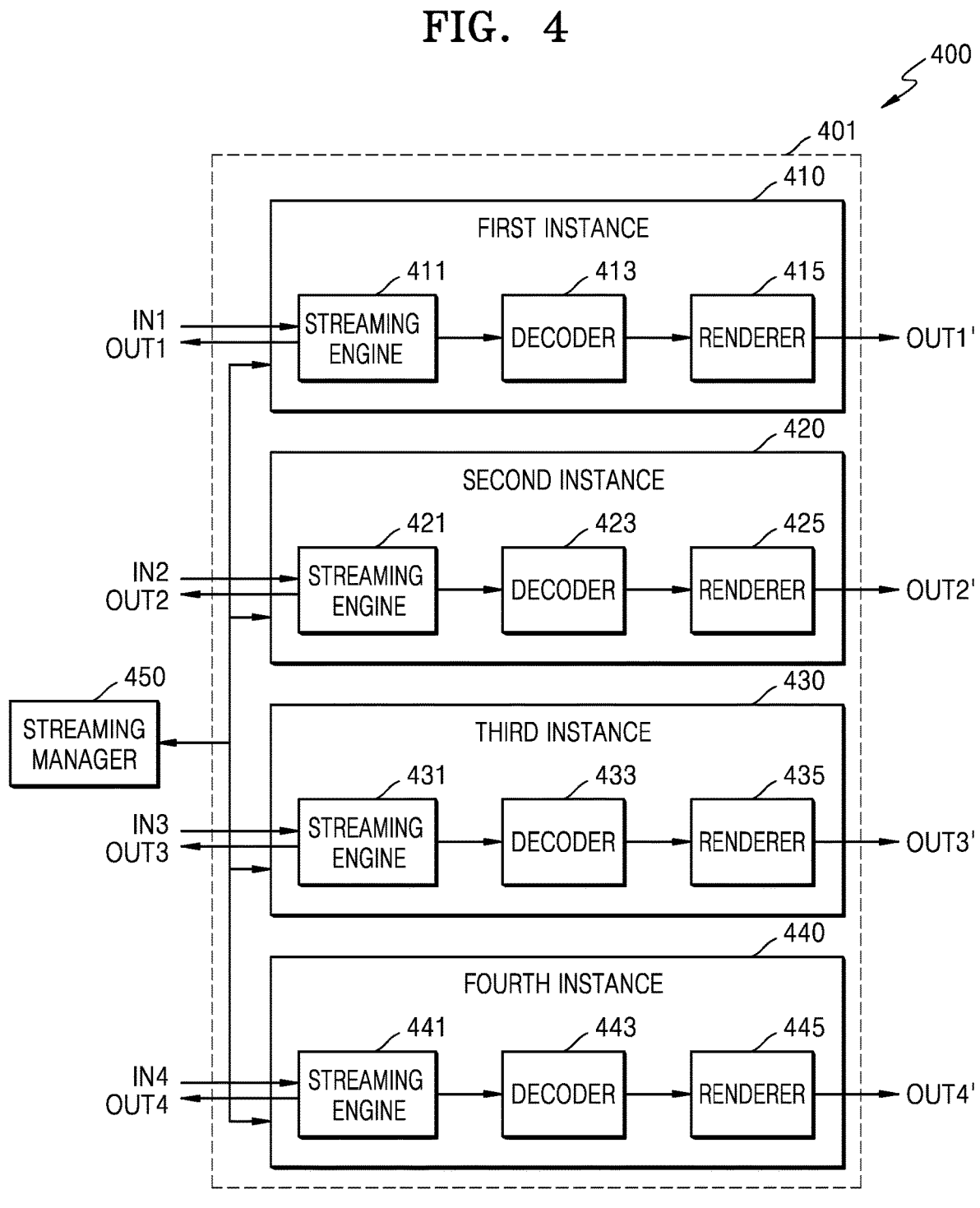
FIG. 4 is an internal block diagram of a streamer according to an embodiment.

FIG. 4 is an internal block diagram of a streamer according to an embodiment.

Referring to FIG. 4, a streamer 400 may include a streaming module 401 including instances 410 to 440 respectively generated for multi-streams and a streaming manager 450 controlling the streaming module 401.

The electronic apparatus may generate a video player to process multi-streams, that is, an instance. The instance may refer to an independent entity having one context. The instance may refer to an individual element of a certain set. That is, the instance may refer to a currently generated object of a process or class that is being executed.

The instance may refer to a code at a software implementation level that defines a function to be performed by a video player. The instances may be loaded into a memory at runtime.

One video player, that is, one instance, may be generated for each stream. That is, when there are four pieces of content to be output through partial screens in the multi-view mode, four instances may be respectively generated for four streams.

The instance may include a plurality of modules that perform a function to be processed by a video player. As illustrated in FIG. 4, first to fourth instances 410 to 440 may include streaming engines 411, 421, 431, and 441, decoders 413, 423, 433, and 443, and renderers 415, 425, 435, and 445.

The first instance 410 may process a first stream. The first instance 410 may obtain an address on the server of the first stream from the content information transmitted from the server and request the server to transmit the first stream, by using the obtained address.

The streaming engine 411 included in the first instance 410 may receive packetized data as an input signal IN1 of a certain bit rate and depacketize the received data. The streaming engine 411 may determine the bit rate according to the size and interval received by using the size and interval of the packetized data received as the input signal IN1.

The streaming engine 411 will be described in more detail with reference to FIG. 5.

Figure 5:
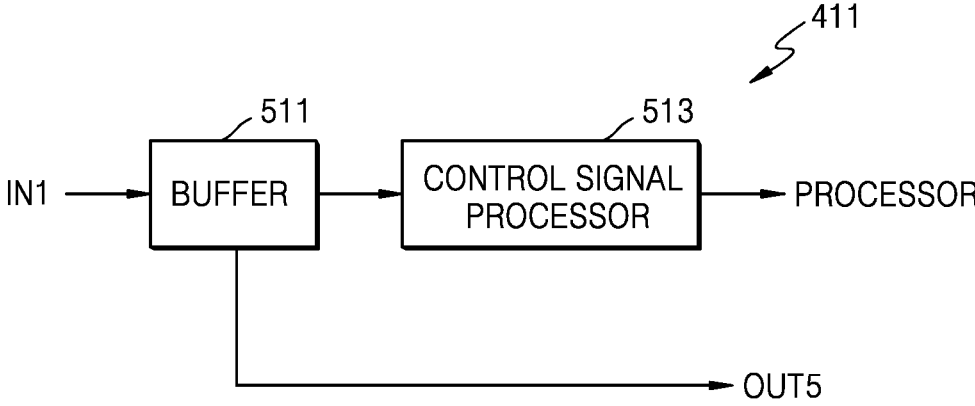
FIG. 5 is an internal block diagram of a streaming engine according to an embodiment.

FIG. 5 is an internal block diagram of a streaming engine according to an embodiment.

Referring to FIG. 5, the streaming engine 411 may include a buffer 511 and a control signal processor 513. The buffer 511 may be a space in which packetized data received through a streaming path is depacketized, generated as an access unit, and buffered. In order to detect the occupation state of the buffer 511, a lower buffer limit (LBL) and an upper buffer limit (UBL) of buffering for receiving data may be set in the buffer 511. The lower buffer limit and the upper buffer limit may be equal to each other, or the lower buffer limit may have a lower value than the upper buffer limit.

The spaces of the buffers in the streaming engines 411, 421, 431, and 441 respectively included in the instances 410, 420, 430, and 440 may be independent of each other with respect to each of the instances 410, 420, 430, and 440. That is, the capacities, the upper buffer limits, or the lower buffer limits of the buffers may be independent of each other with respect to each of the buffers included in each of the instances 410, 420, 430, and 440.

The streaming engine 411 or the streaming manager 450 may continuously check the space state of the buffer 511. When data is stored in the buffer below the lower buffer limit, it may mean that an underflow has occurred. The occurrence of the underflow may mean that data to be read from the buffer is insufficient. Thus, when an underflow occurs in the buffer, because data to be transmitted backward is insufficient, the download speed may be decreased or the reproduction may be interrupted.

When data is stored in the buffer above the upper buffer limit, it may mean that the amount of data secured in the buffer is greater than or equal to a certain value to be seamlessly reproduced.

In an embodiment, the buffer 511 may receive an input of the first stream transmitted from the server, as packetized data. The buffer 511 may receive the packetized data of a certain bit rate as the input signal IN1 and depacketize and store the received data.

The buffer 511 may inform the control signal processor 513 of the size and interval of the packetized data received as the input signal IN1.

The control signal processor 513 may receive the size and interval of the packetized data from the buffer 511 and determine the bit rate according to the received size and interval. Also, the control signal processor 513 may check the buffering state of the buffer 511 and generate a control signal by using the bit rate and the buffering state of the buffer 511. The control signal processor 513 may transmit the control signal to the server as an output signal OUT1.

The server may receive the control signal, generate data with a bit rate according to the control signal, and transmit the data to the electronic apparatus.

Referring back to FIG. 4, the streaming engine 411 may transmit the depacketized data stored in the buffer 511 to the decoder 413 as an output signal OUTS. The decoder 413 may receive the depacketization result from the streaming engine 411, decode the same, and transmit the decoding result to the renderer 415. The renderer 415 may render the decoding result and output the rendering result as the output signal OUT1'.

In an embodiment, the streaming manager 450 may control the first to fourth instances 410 to 440 to determine which stream is to be buffered. The streaming manager 450 may consider the priority identification information of each stream received from the server or set by the user, to determine which stream is to be buffered. In an embodiment, the streaming manager 450 may control each of the instances 410, 420, 430, and 440 to perform adaptive streaming from the stream having the higher priority.

The streaming manager 450 may control each of the instances 410, 420, 430, and 440 such that the streams with the next priority may be sequentially buffered after buffering of the stream with the higher priority is completed according to the priority. The streaming manager 450 may identify that the first stream has the highest priority, and control the first instance 410 such that the first stream may be buffered. In this case, the streaming manager 450 may control the other instances 420, 430, and 440 not to perform buffering. When buffering of the first stream is completed, the streaming manager 450 may control the second instance 420 to perform buffering of the stream with the next priority, that is, the second stream.

In an embodiment, the streaming manager 450 may first determine whether to buffer the stream subsequent to the second stream before performing buffering thereon. The streaming manager 450 may determine whether to perform buffering of each stream based on at least one of the state of the network bandwidth, the buffer state of each of the streaming engines 411, 421, 431, and 441 receiving each stream in each of the instances 410, 420, 430, and 440, and the bit rate of each stream. For example, the streaming manager 450 may predict whether an underflow will occur after a certain time point in the buffer 511 of the streaming engine 411 that receives the first stream. When it is predicted that an underflow will not occur in the buffer of the streaming engine 411, the streaming manager 450 may control the streaming engine 421 included in the second instance 420 to buffer the second stream.

Similarly, the streaming manager 450 may determine whether an underflow will occur in the buffer of the streaming engine 421 included in the second instance 420. When it is predicted that an underflow will occur in the buffer of the streaming engine 421, the streaming manager 450 may control the streaming engine 431 included in the third instance 430 not to buffer the third stream.

FIG. 6 is a diagram for describing priority identification information in multi-streams, according to an embodiment.

When generating multi-streams, the content provider may generate content information representing content attributes. The content information may be a type of metadata including bibliographic data about the multi-streams. The content information may be transmitted from the server separately from the multi-streams. Alternatively, the content information may be transmitted together with the multi-streams.

The content information may include priority identification information representing the relationship between the multi-streams.

As an example of priority identification information 600, FIG. 6 illustrates that the priority identification information 600 is written in a json format. However, this is merely an embodiment, and the priority identification information may be written in XML, HTML, or other formats.

As in FIG. 6, the priority identification information 600 may include at least one of an identifier indicating whether each stream is a main stream or a sub-stream, an identifier indicating a stream with which a sub-stream is to be synchronized, and information representing the priority of each stream.

FIG. 7 is a diagram for describing receiving an input of priority identification information from a user, according to an embodiment.

In an embodiment, when the content provider does not generate the priority identification information, an electronic apparatus 700 may randomly set the priority between the multi-streams. Alternatively, the electronic apparatus 700 may ask the user the priority between the multi-streams and receive a priority setting from the user.

In an embodiment, even when the content provider generates the priority identification information, the user may want to change the priority between the multi-streams according to the user's taste. For example, it is assumed that the content is content for each of the performers who play the piano, the violin, and the cello respectively. The electronic apparatus 700 may display the performer playing each instrument in the corresponding performance, through each partial screen of the multi-view mode. In this case, the user may want to set the priority of each stream according to the order of instruments he or she likes, unlike the priority preset by the content provider. In this case, the user may directly set the priority by controlling the electronic apparatus 700.

Referring to FIG. 7, when outputting the multi-view, the electronic apparatus 700 may display a first interface screen 710 for asking the user whether to set the priority between the pieces of content output in multi-view. As in FIG. 7, the first interface screen 710 may be displayed in the form of a text window on a partial area of the screen of the electronic apparatus 700. The size, output position, transparency, and/or shape of the first interface screen 710 may be variously modified.

When a user input for selecting a 'Yes' menu is received through the first interface screen 710, the electronic apparatus 700 may output a second interface screen 720 and a third interface screen 730 for setting the priority between the multi-streams.

The second interface screen 720 may be a screen in the form of a text window including the content for instructing to select a stream to be set as a main stream among the multi-streams. The third interface screen 730 may be a screen in which a plurality of partial screens currently provided by the electronic apparatus 700 in the multi-view mode and the same shape as the arrangement of the partial screens are reduced and displayed. On the third interface screen 730, the user may select a stream to be set as a main stream among the streams respectively output from the partial screens.

Similarly, the electronic apparatus 700 may receive a selection of the first to fourth streams from the user in descending order of priority.

The electronic apparatus 700 may store information about the priority selected by the user in a memory or the like. When reproducing the multi-view, the electronic apparatus 700 may perform buffering from the stream with the higher priority in consideration of the priority selected by the user.

Figure 8:
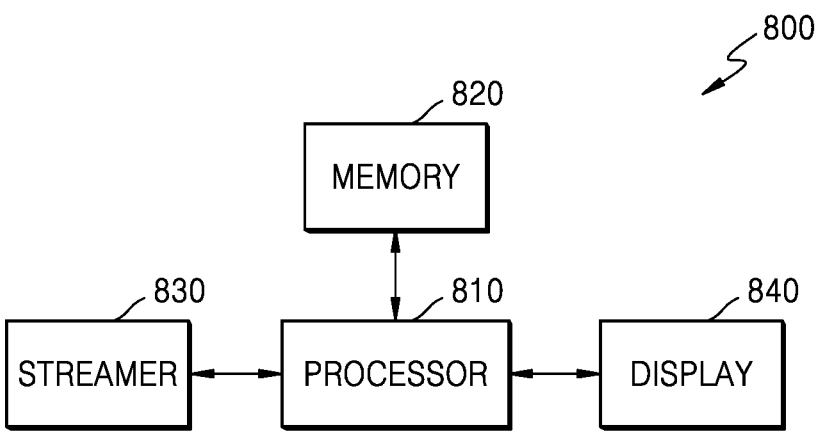
FIG. 8 is an internal block diagram of an electronic apparatus according to an embodiment.

FIG. 8 is an internal block diagram of an electronic apparatus according to an embodiment.

Referring to FIG. 8, an electronic apparatus 800 may include a processor 810, a memory 820, a streamer 830, and a display 840.

In an embodiment, the electronic apparatus 800 may be an image display apparatus. The image display apparatus may be a digital TV capable of receiving digital broadcast but is not limited thereto and may be implemented as various types of electronic apparatuses including a display to output multi-streams in multi-view.

For example, the electronic apparatus 800 may include at least one of a desktop computer, a smartphone, a tablet personal computer (PC), a mobile phone, a video phone, an e-book reader, a laptop PC, a netbook computer, a digital camera, a personal digital assistant (PDA), a portable multimedia player (PMP), a camcorder, a navigation, a wearable device, a smart watch, a home network system, a security system, and a medical device.

The electronic apparatus 800 may be of a stationary type or a mobile type. The electronic apparatus 800 may be connected to a source device (not illustrated). The source device may include at least one of a personal computer (PC), a DVD player, a video game machine, a set-top box, an AV receiver, a cable receiver or a satellite broadcast receiver, and an Internet receiver that receives content from an over-the-top (OTT) service provider or an Internet protocol television (IPTV) service provider.

In an embodiment, the display 840 may display content provided by content providers, on the screen thereof. The display 840 may output a broadcast program received in real time, on the screen or may output content streamed or downloaded from a server, on the screen.

In an embodiment, the display 840 may output content in the multi-view mode. The display 840 may divide the screen into a plurality of partial screens and display different pieces of content on the plurality of partial screens to provide content in the multi-view mode. The display 840 may output each content on each partial screen.

When the display 840 is implemented as a touch screen, the display 840 may be used as an input device such as a user interface in addition to an output device. For example, the display 840 may include at least one of a liquid crystal display, a thin film transistor-liquid crystal display, an organic light emitting diode display, a flexible display, a three-dimensional (3D) display, and an electrophoretic display. Also, the display 840 may include two or more displays according to the implementation forms thereof.

The memory 820 according to an embodiment may store at least one instruction. The memory 820 may store at least one program executed by the processor 810. A predefined operation rule or program may be stored in the memory 820. Also, the memory 820 may store data input to or output from the electronic apparatus 800.

The memory 820 may include at least one type of storage medium from among flash memory type, hard disk type, multimedia card micro type, card type memory (e.g., SD or XD memory), random access memory (RAM), static random access memory (SRAM), read only memory (ROM), electronically erasable programmable read only memory (EEPROM), programmable read only memory (PROM), magnetic memory, magnetic disk, and optical disk.

In an embodiment, the streamer 830 may receive multi-streams from the server. The streamer 830 may be manufactured in the form of at least one hardware chip and mounted on the electronic apparatus 800 or may be implemented as a software module.

The streamer 830 may adaptively stream the multi-streams from the server.

In an embodiment, the streamer 830 may receive content information. The content information may include an address on the server capable of streaming each stream, for example, a URL. The streamer 830 may identify an address on the server at which each stream is stored, based on the content information and access the identified address to receive each of the streams.

In an embodiment, the content information may include priority identification information. Alternatively, when the priority identification information is not included in the content information, the streamer 830 may obtain the priority identification information separately from the content information.

In an embodiment, the streamer 830 may obtain the priority identification information from a header of a main stream among the multi-streams or may obtain the priority identification information from metadata transmitted separately from the multi-streams.

In an embodiment, the priority identification information may include information for identifying a stream with which a sub-stream is to be synchronized.

In an embodiment, the streamer 830 may identify the first stream with the highest priority from the priority identification information. The streamer 830 may first buffer the first stream with the highest priority. That is, by allocating an available network bandwidth to stream the first stream with the highest priority, the streamer 830 may allow the first stream to be seamlessly reproduced with high image quality.

The streamer 830 may determine whether to perform buffering on the stream subsequent to the second stream, in consideration of priority. The streamer 830 may determine whether to buffer each stream, based on the state of an available network bandwidth, the space of the buffer receiving each stream, the bit rate of each stream, or the like.

In an embodiment, the streamer 830 may not perform buffering on the stream with the next priority when it is predicted that an underflow will occur in the buffer receiving each stream. For example, when occurrence of an underflow is not predicted in the buffer receiving each of the first stream and the second stream and occurrence of an underflow is predicted in the buffer receiving the third stream, the streamer 830 may allow the first to third streams to be seamlessly reproduced by performing buffering from the first stream to the third stream and not performing buffering on the fourth stream.

In an embodiment, the streamer 830 may sequentially buffer each stream according to priority. That is, when buffering of the first stream is completed, the streamer 830 may start buffering of the second stream. When buffering of the stream is completed, it may mean that the buffer receiving the stream is filled with data by a certain reference value or more. In order to output the main stream through the screen as quickly as possible, the electronic apparatus 800 may buffer the stream with the next priority after first buffering the main stream.

In another embodiment, the streamer 830 may simultaneously buffer streams in which occurrence of an underflow is not predicted. That is, in the above example, the streamer 830 may simultaneously perform buffering from the first stream to the third stream.

In an embodiment, in a state where streams are already buffered and thus each content is output in multi-view through the display 840, the streamer 830 may determine that data is insufficient in the buffer receiving the main stream. That is, by considering the threshold value and the space of the buffer receiving the main stream, the streamer 830 may determine whether an underflow will occur because the bit rate of the main stream decreases below the threshold value. When an underflow occurs, because an image of the stream is interrupted or the image quality thereof is degraded, the streamer 830 may pause buffering of the streams with the lower priority, in an embodiment. That is, the streamer 830 may prevent the degradation of the reproduction quality of the stream with the higher priority by allocating all of the available network bandwidth to the buffering of the main stream.

In an embodiment, the streamer 830 may stop buffering of the streams subsequent to the second stream when occurrence of an underflow is predicted in the buffer receiving the first stream while the display 840 outputs the content in multi-view.

In an embodiment, the streamer 830 may re-buffer the streams subsequent to the second stream when the amount of data in the buffer receiving the first stream is predicted to be greater than or equal to a certain value after buffering of the streams subsequent to the second stream is stopped.

In an embodiment, in a state where the first stream among the multi-streams is first buffered and thus buffering of the streams subsequent to the second stream is not yet completed or buffering of the streams subsequent to the second stream is paused, when the amount of data in the buffer of the main stream is predicted to be greater than or equal to a certain value, the streamer 830 may switch states thereof such that that the pieces of sub-content may also be synchronized and reproduced together with the main content. That is, by considering the state of the network bandwidth, the streamer 830 may predict a time point at which the sub-streams may be secured in the buffer by a threshold value or more, that is, a time point at which buffering of the sub-streams will be completed. The streamer 830 may identify a packet to be reproduced at the predicted time point among the packets of the first stream. In order for the content of sub-streams to be reproduced in synchronization with the content of the main stream at the predicted time point, the streamer 830 may perform buffering from data to be reproduced after the predicted time point among the data of the sub-stream.

The processor 810 may control an overall operation of the electronic apparatus 800. The processor 810 may control the electronic apparatus 800 to function by executing one or more instructions stored in the memory 820.

In an embodiment, the processor 810 may obtain multi-content from each of the multi-streams. The processor 810 may control the display 840 such that the display 840 may output the multi-content in multi-view by using a plurality of partial screens.

In an embodiment, the processor 810 may directly perform a function performed by the streamer 830. That is, the processor 810 may obtain priority identification information about each stream and perform adaptive streaming by allocating the network bandwidth in the order of the first stream with the higher priority by using the priority identification information. The processor 810 may determine whether to perform buffering on the stream subsequent to the second stream, based on the state of the network bandwidth, the space of the buffer receiving the stream, and/or the bit rate of the stream. The processor 810 may predict whether an underflow will occur in the buffer receiving the first stream or whether the amount of data in the buffer will be greater than or equal to a certain value. When it is predicted that an underflow will occur in the buffer receiving the first stream, the processor 810 may stop buffering of other streams.

When the amount of data in the buffer receiving the first stream is predicted to be greater than or equal to a certain value, the processor 810 may re-buffer the streams on which buffering has been stopped. When re-buffering the streams on which buffering has been stopped, in order to reproduce the first stream and other streams in synchronization with each other, the processor 810 may predict the buffering completion time point of other streams, identify the packet of the first stream to be reproduced at the predicted time point, and perform buffering from the packets of other streams to be output in synchronization with the identified packet.

In an embodiment, the processor 810 may adjust the reproduction speed of each content in order to synchronize pieces of multi-content. The processor 810 may obtain a time point at which the multi-content will be synchronized and reproduced. By adjusting the reproduction speed of the pieces of content obtained from the streams subsequent to the second stream, the processor 810 may control the display 840 such that the content obtained from the first stream and the pieces of content obtained from the streams subsequent to the second stream may be reproduced in synchronization with each other from the reproduction time point thereof.

More particularly, when there is a stream having a reproduction speed lower than the reproduction speed of the first stream among the streams subsequent to the second stream, the processor 810 may control the electronic apparatus 800 to perform buffering while dropping a packet of the slower stream or a frame of the content obtained from the slower stream.

Alternatively, when there is a stream having a reproduction speed higher than the reproduction speed of the first stream among the streams subsequent to the second stream, the processor 810 may synchronize the pieces of content by controlling the electronic apparatus 800 to read a packet of the faster stream slowly from the buffer.

Figure 9:
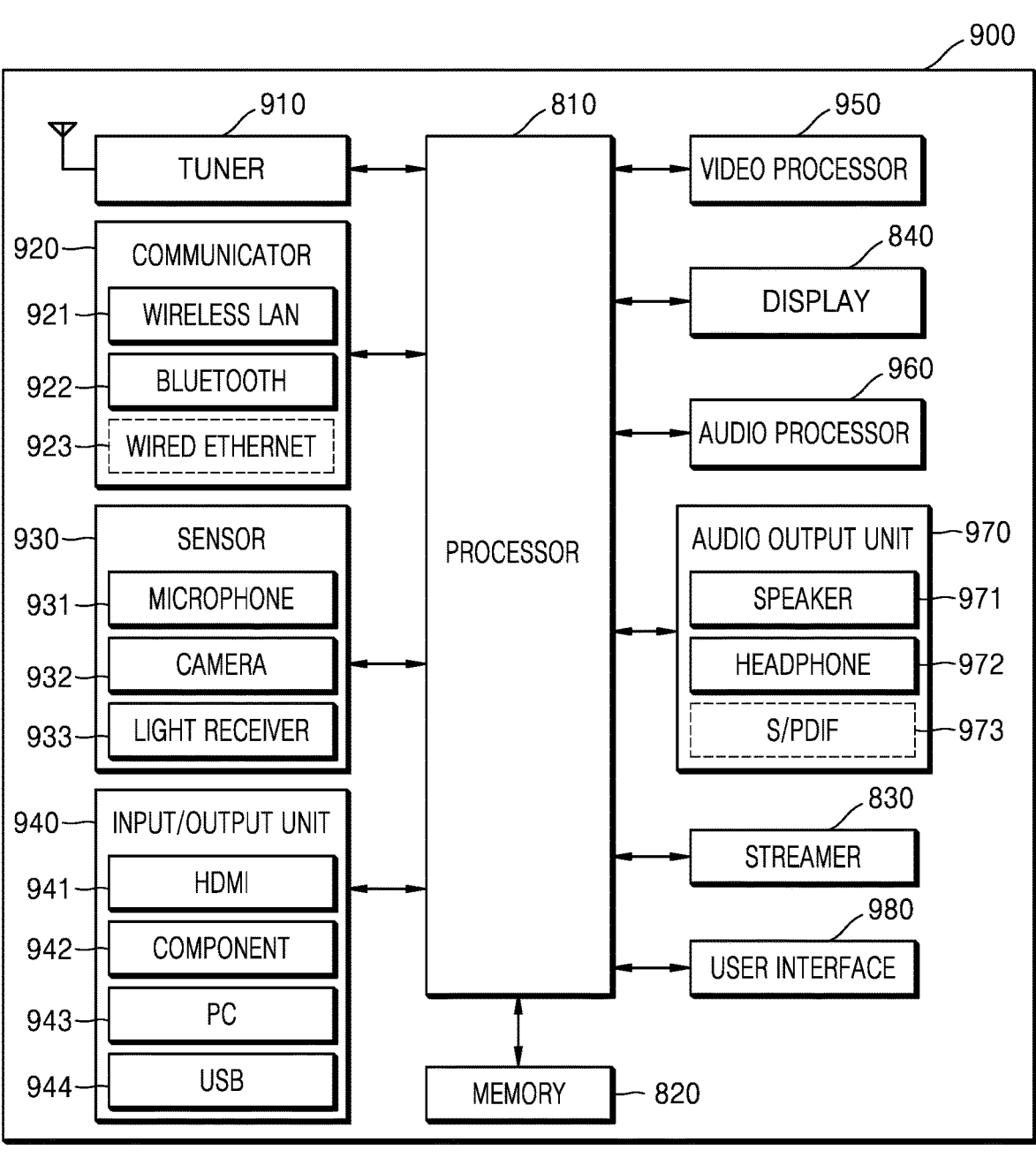
FIG. 9 is an internal block diagram of an electronic apparatus according to an embodiment.

FIG. 9 is an internal block diagram of an electronic apparatus 900 according to an embodiment.

Referring to FIG. 9, in addition to the processor 810, the memory 820, the streamer 830, and the display 840, the electronic apparatus 900 may further include a tuner 910, a communicator 920, a sensor 930, an input/output unit 940, a video processor 950, an audio processor 960, an audio output unit 970, and a user interface 980.

The electronic apparatus 900 of FIG. 9 may include the elements of the electronic apparatus 800 of FIG. 8. Thus, redundant descriptions already given with respect to the processor 810, the memory 820, the streamer 830, and the display 840 with reference to FIG. 8 will be omitted for conciseness.

The electronic apparatus 900 of FIG. 9 may be an image display apparatus capable of outputting content in multiview. For example, the electronic apparatus 900 may include at least one of a digital TV, a desktop computer, a smartphone, a tablet personal computer (PC), a mobile phone, a video phone, an e-book reader, a laptop PC, a netbook computer, a digital camera, a personal digital assistant (PDA), a portable multimedia player (PMP), a camcorder, a navigation, a wearable device, a smart watch, a home network system, a security system, and a medical device.

The processor 810 may control an overall operation of the electronic apparatus 900. The processor 810 may control the electronic apparatus 900 to function by executing one or more instructions stored in the memory 820.

The tuner 910 may process broadcast content, which is received by wire or wireless, through amplification, mixing, and/or resonance, and may tune and select only the frequency of a channel, which is to be received by the electronic apparatus 900, among a plurality of wave components. The content received through the tuner 910 may be decoded (e.g., audio decoding, video decoding, or additional information decoding) to be divided into audio, video, and/or additional information. The audio, video, and/or additional information may be stored in the memory 820 under the control by the processor 810. In an embodiment, the additional information may be transmitted while being included in the video.

The communicator 920 may connect the electronic apparatus 900 to an external device or a server under the control by the processor 810. The electronic apparatus 900 may download a program or an application required by the electronic apparatus 900 from an external device or a server or perform web browsing through the communicator 920.

The communicator 920 may include one of wireless LAN 921, Bluetooth 922, and wired Ethernet 923 corresponding to the structure and performance of the electronic apparatus 900. Also, the communicator 920 may include any combination of the wireless LAN 921, the Bluetooth 922, and the wired Ethernet 923. The communicator 920 may receive a control signal through a controller (not illustrated) such as a remote control under the control by the processor 810. The control signal may be implemented as a Bluetooth type, an RF signal type, or a WiFi type. The communicator 920 may further include other short-range communications (e.g., Near Field Communication (NFC) (not illustrated) and Bluetooth Low Energy (BLE) (not illustrated)) in addition to Bluetooth 922. According to an embodiment, the communicator 920 may transmit/receive a connection signal to/and from an external device through short-range communication such as Bluetooth 922 or BLE.

The sensor 930 may sense the user's voice, the user's image, or the user's interaction and may include a microphone 931, a camera 932, and a light receiver 933. The microphone 931 may receive an utterance voice of the user, convert the received voice into an electrical signal, and output the same to the processor 810.

The camera 932 may include a sensor (not illustrated) and a lens (not illustrated) and may obtain an image formed on the screen.

The light receiver 933 may receive a light signal (including a control signal). The light receiver 933 may receive a light signal corresponding to a user input (e.g., touch, press, touch gesture, voice, or motion) from a controller (not illustrated) such as a remote control or a mobile phone. The control signal may be extracted from the received light signal under the control by the processor 810.

The input/output unit 940 may receive video (e.g., moving image signal or still image signal), audio (e.g., voice signal or music signal), and additional information (e.g., description of content, content title, or content storage position) from an external database or server provided by the content providers, under the control by the processor 810. Here, the additional information may include metadata about the content.

The input/output unit 940 may include one of a High-Definition Multimedia Interface (HDMI) port 941, a component jack 942, a PC port 943, and a USB port 944. The input/output unit 940 may include any combination of the HDMI port 941, the component jack 942, the PC port 943, and the USB port 944.

The video processor 950 may process image data to be displayed by the display 840 and perform various image processing operations such as decoding, rendering, scaling, noise reduction, frame rate conversion, and resolution conversion on the image data. When receiving a request for multi-view output, the video processor 950 may process each of a plurality of pieces of content.

The audio processor 960 may perform processing on audio data. The audio processor 960 may perform various processings such as decoding, amplification, and/or noise reduction on the audio data.

Under the control by the processor 810, the audio output unit 970 may output the audio included in the content received through the tuner 910, the audio input through the communicator 920 or the input/output unit 940, or the audio stored in the memory 820. The audio output unit 970 may include at least one of a speaker 971, a headphone output port 972, or a Sony/Philips Digital Interface (S/PDIF) output port 973.

In an embodiment, the streamer 830 may be implemented as a combination of suitable software, logic, circuit, interface, and/or code that may be operated to perform a multi-streaming service function described in the present disclosure.

In an embodiment, the streamer 830 may perform streaming by first allocating the network bandwidth to the stream having the higher priority among multi-streams by considering the relationship between multi-streams when receiving multi-streams.

In an embodiment, the streamer 830 may obtain priority identification information about each stream, buffer the first stream having the highest priority first, and buffer the streams with the next priority after completion of the buffering of the first stream.

In an embodiment, the streamer 830 may determine whether to perform buffering by considering the bit rate of each stream or the like. The streamer 830 may predict whether an underflow will occur in the buffer receiving the first stream or whether the amount of data in the buffer will be greater than or equal to a certain value and may accordingly determine whether to perform buffering of the streams subsequent to the second stream.

Although the streamer 830 is illustrated as a separate component in FIG. 9, this is merely an embodiment and a function performed by the streamer 830 may be performed by the processor 810.

The user interface 980 may receive a user input for controlling the electronic apparatus 900. The user interface 980 may include, but is not limited to, various types of user input devices such as a touch panel for detecting a user's touch, a button for receiving a user's push operation, a wheel for receiving a user's rotation operation, a keyboard, a dome switch, a microphone for voice recognition, and a motion detection sensor for sensing a motion.

Also, when the electronic apparatus 900 is operated by a remote controller (not illustrated), the user interface 980 may receive a control signal received from the remote controller. The remote controller may control the electronic apparatus 800 by using short-distance communication including infrared or Bluetooth communication. The remote controller may control a function of the electronic apparatus 900 through the user interface 980 by using at least one of a key or button, a touchpad, a microphone (not illustrated) capable of receiving a user's voice, and a sensor (not illustrated) capable of recognizing a motion of the controller.

According to an embodiment, the user may control the electronic apparatus 900 through the user interface 980 to perform various functions of the electronic apparatus 900. By controlling the electronic apparatus 900 by using the user interface 980, the user may directly set the priority between the pieces of content output in multi-view.

Figure 10:
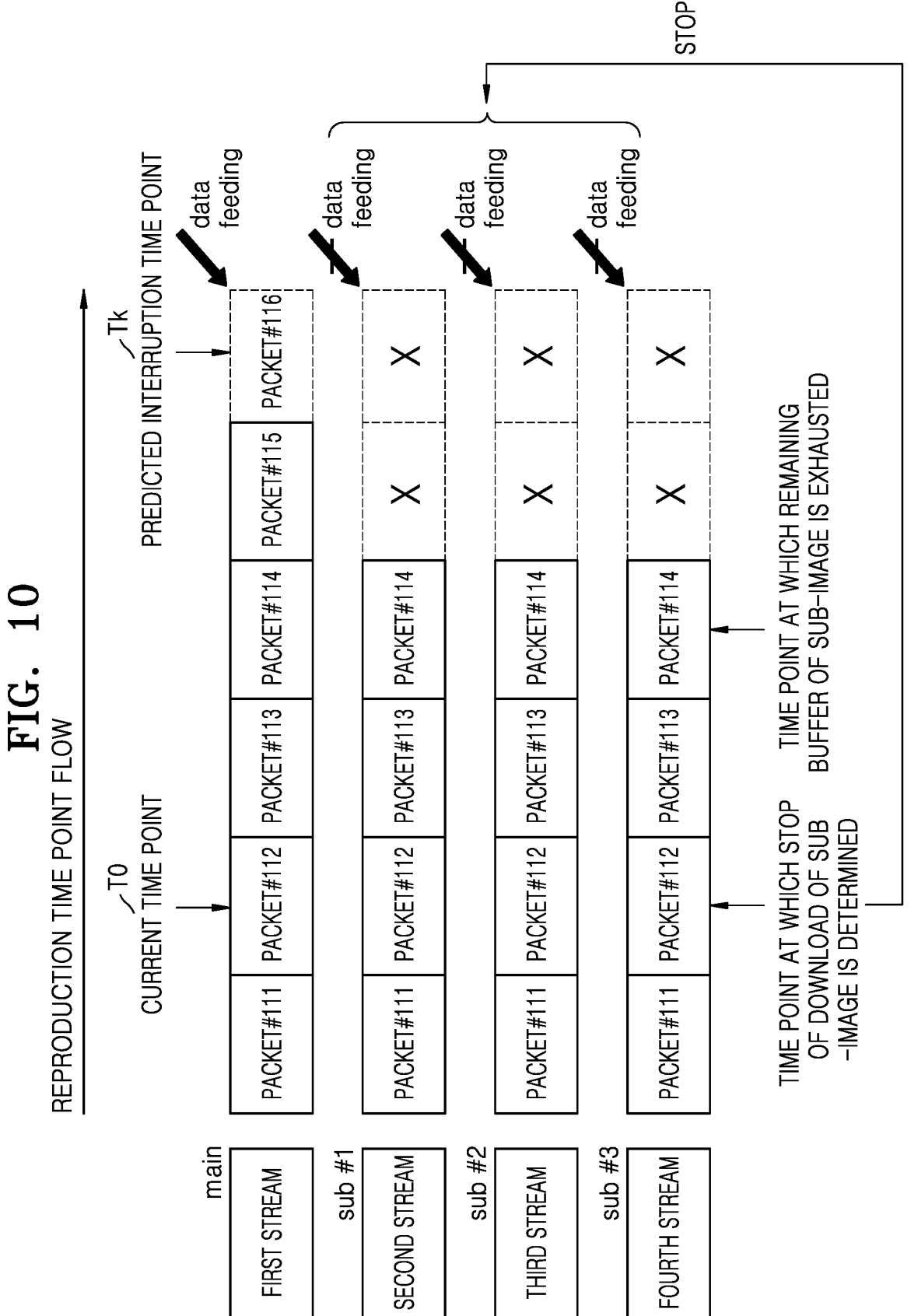
FIG. 10 is a diagram for describing an electronic apparatus managing buffering of multi-streams, according to an embodiment.

FIG. 10 is a diagram for describing that an electronic apparatus manages buffering of multi-streams, according to an embodiment.

Referring to FIG. 10, the electronic apparatus may receive and buffer multi-streams from a server. FIG. 10 illustrates a buffer for each stream, and each stream may be input to the buffer in the form of packetized data.

The electronic apparatus may request the multi-streams from the server and receive the multi-streams from the server to receive an input of packetized data into a buffer for each stream.

The electronic apparatus may identify the priority of each stream by using the priority identification information. In FIG. 10, the electronic apparatus may receive a first stream, a second stream, a third stream, and a fourth stream from the server and identify the first stream as a main stream and the second to fourth streams as sub-streams by using priority identification information. Also, the priority of the second to fourth streams may be identified by using the priority identification information.

The electronic apparatus may obtain content by demuxing and decoding each of the packets and output the content in multi-view. In FIG. 10, the electronic apparatus may continuously monitor a change in the environment of the electronic apparatus or the environment of the network bandwidth while reproducing four pieces of content in multi-view. That is, the electronic apparatus may continuously check the state of the network bandwidth and the space state of the buffer receiving each stream and request the server to transmit a stream with the higher bit rate or the lower bit rate, according to a change in the environment.

In an embodiment, the electronic apparatus may continuously check the buffer space of the first stream in order to ensure reproduction from the stream with the highest priority.

In FIG. 10, the electronic apparatus may predict that data to be read from the buffer will become insufficient because an underflow occurs in the buffer of the first stream. That is, the electronic apparatus may predict that the first stream will be interrupted, downloaded at reduced speed, or reproduced with low image quality because an underflow occurs at a time point Tk after a certain time from a current time point T0. In this case, the electronic apparatus may switch to a state where downloading of other streams having the lower priority is paused.

For example, it is assumed that the network bandwidth currently dedicated to stream the first stream is 900 KBPS, data for seamless reproduction of the first stream is 1 mega BPS, and 3-megabyte data is currently stored in the buffer of the first stream. Also, it is assumed that the lower buffer limit at which an underflow occurs in the buffer of the first stream is 2 megabytes. In this case, because 100 KB per second is insufficient, the electronic apparatus may predict that 1-megabyte data among the data stored in the buffer will become insufficient 10 seconds after the current time point and thus an underflow will occur. In an embodiment, in order to prevent the download speed of the first stream from being reduced at the time point Tk that is 10 seconds later, the electronic apparatus may stop downloading of other streams with the lower priority, that is, the second to fourth streams, at the current time point T0. From the current time point T0, the electronic apparatus may buffer only the first stream and stop buffering of the second to fourth streams. When the electronic apparatus stops buffering of the second to fourth streams, because all of the available network bandwidth is allocated to stream the first stream, the first stream may be seamlessly buffered.

In this case, as for the data already buffered and stored in the buffer receiving the first to fourth streams, the electronic apparatus may reproduce the content by continuously reading the remaining data, that is, up to packet #114, as illustrated in FIG. 10. After all of the data remaining in the buffer of the second to fourth streams is reproduced, the electronic apparatus may pause reproduction of the second to fourth content. For example, the electronic apparatus may continuously output the second content last reproduced through the second screen or may output a predetermined image, for example, a black image, on the second screen.

In another embodiment, the electronic apparatus may stop buffering of the streams in ascending order of priority, instead of stopping the buffering of all streams with the lower priority. For example, when the available network bandwidth of the electronic apparatus is 100 KBPS, the network bandwidth required by the first stream is 60 KBPS, and the network bandwidth required by each of the second to fourth streams is 30 KBPS, the first stream and the second stream may be continuously buffered and the third stream and fourth stream may be stopped from being downloaded or may be reproduced with low image quality. Alternatively, as for the third stream and the fourth stream, the electronic apparatus may stop buffering of video data and buffer only audio data with a small data capacity to reproduce an audio signal.

FIG. 11 is a diagram for describing that an electronic apparatus manages buffering of multi-streams, according to an embodiment.

Referring to FIG. 11, the electronic apparatus may receive and buffer multi-streams from a server. FIG. 11 illustrates a buffer for each stream, and each stream may be input to the buffer in the form of packetized data.

As described with reference to FIG. 10, it is assumed that the electronic apparatus receives multi-streams from the server and reproduces content in multi-view, and continuously buffer only the first stream and pauses downloading of the other second to fourth streams according to an environment change.

When determining that there is data by a certain level or more in the buffer of the first stream with respect to the current time point T0 or there is enough data to be reproduced for more than a certain time, the electronic apparatus may start to re-buffer other streams with the lower priority that have been stopped from being buffered.

For example, it is assumed that the network bandwidth currently dedicated to stream the first stream is 1.5 mega BPS, data for seamless reproduction of the first stream is 1 mega BPS, and 2-megabyte data is currently stored in the buffer of the first stream. Also, it is assumed that a reference value at which the amount of data in the buffer of the first stream is predicted to be equal to or greater than a certain value is 4 megabytes. In this case, because data remains by 0.5 mega BPS per second, the electronic apparatus may predict that 2-megabyte data will be added thereto after 4 seconds and thus the amount of data in the buffer of the first stream will be equal to or greater than a certain value.

In this case, the electronic apparatus may start re-buffering from the second stream with the lower priority. Also, when the amount of data in the buffer of the second stream is predicted to be greater than or equal to a certain value, the electronic apparatus may also buffer the third stream with the next priority.

By considering the available network bandwidth and the network bandwidth required by the second to fourth streams, the electronic apparatus may determine up to which of the second to fourth streams may be buffered. The electronic apparatus may re-buffer the streams to the range allowable by the network bandwidth.

When re-buffering streams that have been paused from being buffered, the electronic apparatus may first predict a time point at which buffering of the streams will be completed. For example, when the electronic apparatus determines to re-start buffering of the second stream that have been stopped from being buffered at a time point T0, the electronic apparatus may not re-start buffering from packet #222 of the second stream at the time point T0 but may predict a time point Tk at which the buffer of a reproducible level is predicted to be secured, by considering the time taken to download the stream to be re-buffered.

That is, by considering the time taken from when data starts to be stored in the buffer of the second stream to a time point at which data is stored up to a certain threshold value, that is, the lower buffer limit, in the buffer of the second stream, the electronic apparatus may calculate the time point as a time point at which preparation for reproduction of the second stream will be completed. The electronic apparatus may identify that the packet of the second stream to be reproduced at Tk, which is the time point at which preparation for reproduction of the second stream will be completed, is packet #225 and start buffering from the packet #225 of the second stream.

In an embodiment, the electronic apparatus may predict the time point Tk by using artificial intelligence (AI) technology. The AI technology may include machine learning (deep learning) and element technologies using machine learning. The AI technology may be implemented by using an algorithm. Here, an algorithm or a set of algorithms for implementing the AI technology may be referred to as a neural network.

The electronic apparatus may process input data according to a predefined operation rule or AI model. The predefined operation rule or AI model may be generated by using a particular algorithm. Also, the AI model may be a particular algorithm trained. The electronic apparatus may generate output data corresponding to the input data through the AI model.

In an embodiment, the neural network used by the electronic apparatus may be a neural network trained to predict the resolution or bit rate of the video from the input data. For example, the electronic apparatus may receive an input of the amount of N pieces of previous data received, the time taken to receive the N pieces of previous data, the size of one piece of next data, the buffer size of the current stream, the number of data to be received in the future, and/or the bit rate of last received data and predict the bit rate of the video or the time point Tk from the input.

For example, the electronic apparatus may predict the bit rate of a future video packet or the time point Tk by using a neural network that generates an ABR algorithm by using reinforcement learning such as Pensieve.

Figure 12:
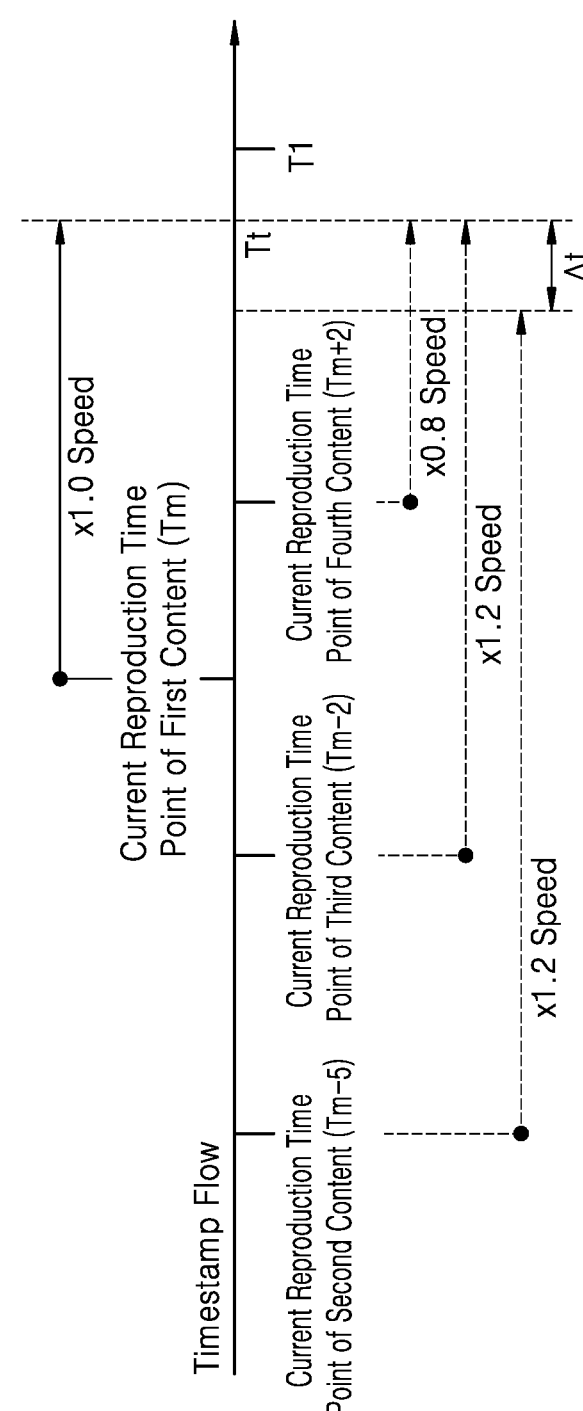
FIG. 12 is a diagram for describing a method of synchronizing and reproducing pieces of content when reproducing the pieces of content in multi-view, according to an embodiment.

FIG. 12 is a diagram for describing a method of synchronizing and reproducing pieces of content when reproducing the pieces of content in multi-view, according to an embodiment.

The electronic apparatus may be required to synchronize and reproduce a plurality of pieces of content in multi-view. However, as described above with reference to FIG. 10 or FIG. 11, when buffering of some streams is stopped and the buffering is re-started to reproduce the content, the re-buffered and reproduced content may not be synchronized with the first content obtained from the first stream.

In an embodiment, the electronic apparatus may determine a time point at which pieces of multi-contents are to be synchronized and reproduced and adjust the reproduction speed of the other pieces of content to the reproduction speed of the first content based on the time point. That is, the electronic apparatus may adjust the reproduction speed of the second to fourth content obtained from the second to fourth streams to the reproduction speed of the first content obtained from the first stream.

As illustrated in FIG. 12, when the current reproduction time point of the first content is Tm, the current reproduction time points of the second content and the third content may be respectively Tm-5 and Tm-2 and may be later than Tm.

The electronic apparatus may set a target time point Tt to synchronize the pieces of content. While continuously reproducing the first content at the original reproduction speed, by faster reproducing the second content and the third content having lower reproduction speed than the first content, the electronic apparatus may synchronize the second content and the third content with the first content at the target time point Tt.

For example, in order to reproduce the third content at 1.2× speed, the electronic apparatus may reproduce the third content faster while discarding about 1.7 packets among 10 packets in any operation from the buffering operation to the rendering operation. The electronic apparatus may send data to the next operation while dropping some pieces of data after buffering data or may render data while discarding data piece by piece in the operation of rendering data that has already been decoded. The electronic apparatus may adjust the reproduction speed of the third content by using various methods such as dropping some data while jumping at certain intervals and may reproduce the third content at the same speed as the first content in synchronization with the first content from the time point Tt.

FIG. 12 illustrates that the second content is still reproduced slower than the first content by Δt at the target time point Tt when the electronic apparatus reproduces the second content at 1.2× speed like the third content. This may mean that the electronic apparatus should reproduce the second content at a double speed faster than the third content to synchronize the second content with the first content at the target time point Tt.

In FIG. 12, the current reproduction time point of the fourth content may be Tm+2 and may be earlier than the reproduction time point of the first content. While continuously reproducing the first content at the original reproduction speed, by slower reproducing the fourth content having higher reproduction speed than the first content, the electronic apparatus may synchronize the fourth content with the first content at the target time point Tt.

For example, in order to reproduce the fourth content slow at 0.8× speed, the electronic apparatus may read the data from the buffer slow for a read time increased by 1.25 times compared to the original read time. The electronic apparatus may decrease the reproduction speed of the fourth content to the time point Tt and reproduce the fourth content at the same speed as the first content from the time point Tt.

When it is predicted that an underflow will re-occur in the buffering of the first stream while reproducing a plurality of pieces of content in synchronization with each other, the electronic apparatus may pause buffering of other stream as described above with reference to FIG. 10. Thereafter, when the amount of data in the buffer of the first stream is predicted to be greater than or equal to a certain value, the electronic apparatus may re-start buffering of the paused stream to synchronize and reproduce the streams as described above with reference to FIG. 11. Also, when buffering of the paused stream is re-started, synchronization of the pieces of content may be ensured by additionally adjusting the reproduction speed thereof as described with reference to FIG. 12.

Figure 13:
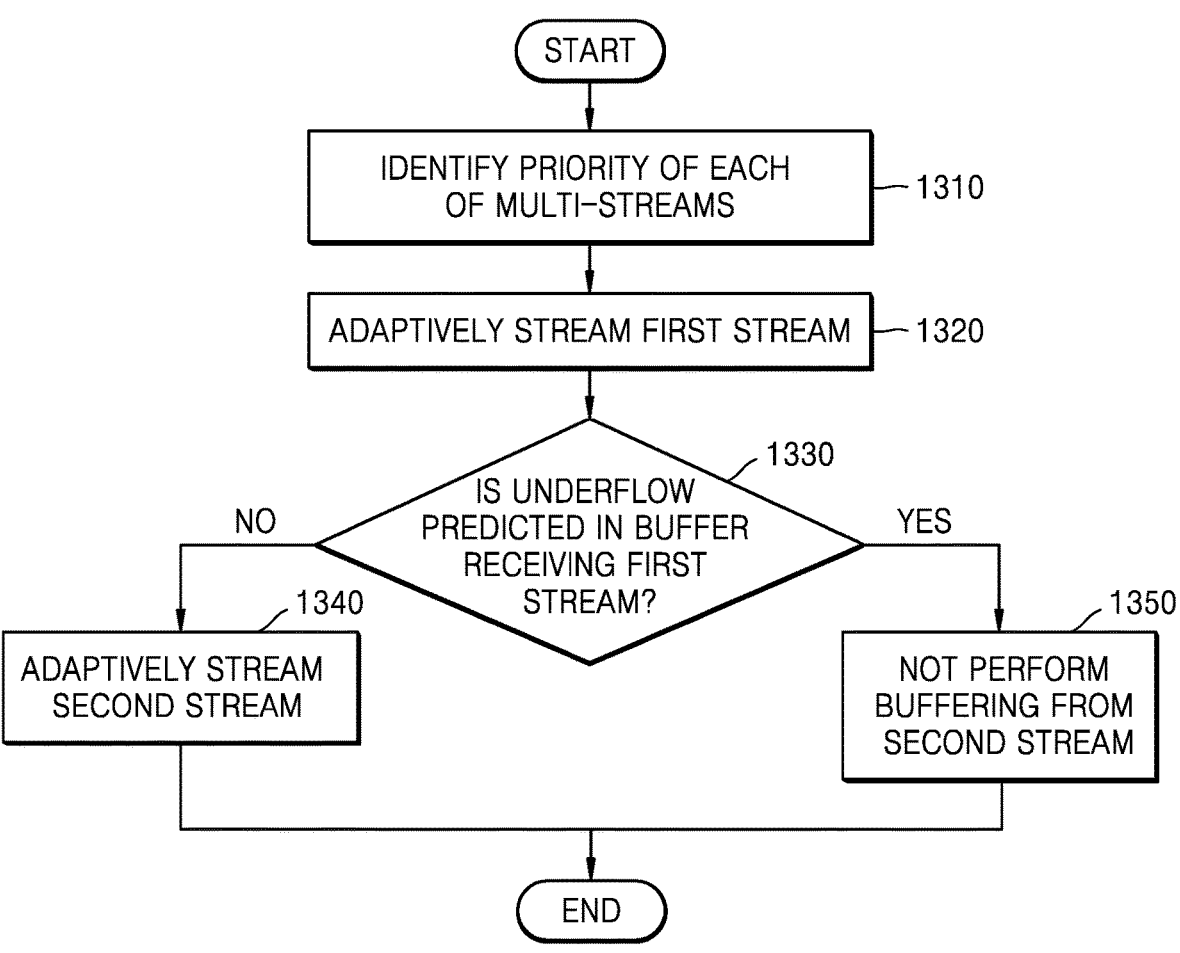
FIG. 13 is a flowchart for describing an operation of buffering multi-streams in consideration of priority, according to an embodiment.

FIG. 13 is a flowchart for describing an operation of buffering multi-streams in consideration of priority, according to an embodiment.

Referring to FIG. 13, when multi-view reproduction is first started by using multi-streams, the electronic apparatus may obtain priority identification information to identify the priority of each stream (operation 1310). The electronic apparatus may adaptively stream the first stream with the highest priority (operation 1320).

The electronic apparatus may determine whether an underflow will occur in the buffer receiving the first stream, by considering the network bandwidth state and/or the buffer space for receiving the first stream (operation 1330). When it is predicted that an underflow will occur in the buffer receiving the first stream, the electronic apparatus may not perform buffering from the second stream (operation 1350).

When it is not predicted that an underflow will occur in the buffer receiving the first stream, the electronic apparatus may adaptively stream the second stream with the next priority (operation 1340).

Figure 14:
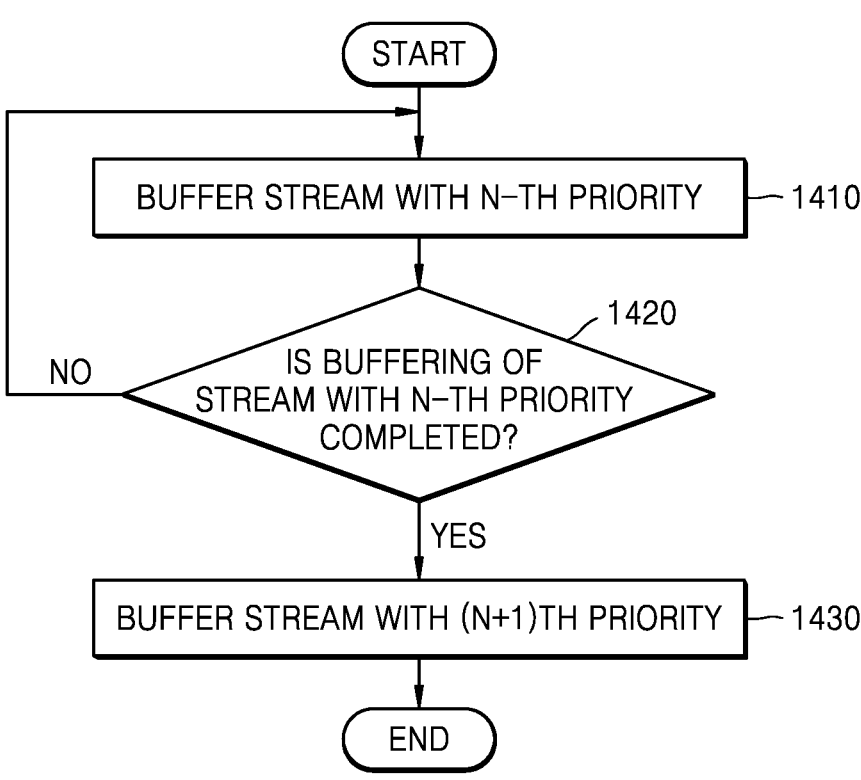
FIG. 14 is a flowchart for describing that an electronic apparatus performs buffering from a stream with a higher priority, according to an embodiment.

FIG. 14 is a flowchart for describing that an electronic apparatus performs buffering from a stream with a higher priority, according to an embodiment.

Referring to FIG. 14, the electronic apparatus may buffer the stream with the N-th priority (operation 1410). The electronic apparatus may first determine whether buffering is possible, based on the state of the network bandwidth, the space of the buffer receiving the N-th stream, and/or the bit rate of the N-th stream. Here, the space of the buffer may be determined by considering the current amount of data in the buffer and a threshold value such as the lower buffer limit or the upper buffer limit that is a point at which an underflow or the amount of data in the buffer is predicted to be greater than or equal to a certain value. When it is determined that buffering of the N-th stream is possible, the electronic apparatus may buffer the N-th stream.

The electronic apparatus may determine whether buffering of the N-th stream is completed (operation 1420) and may buffer the (N+1)th stream with the next priority after completion of the buffering of the N-th stream (operation 1430). When the buffering of the N-th stream is completed and it is predicted that an underflow will not occur, the electronic apparatus may buffer the (N+1)th stream.

Figure 15:
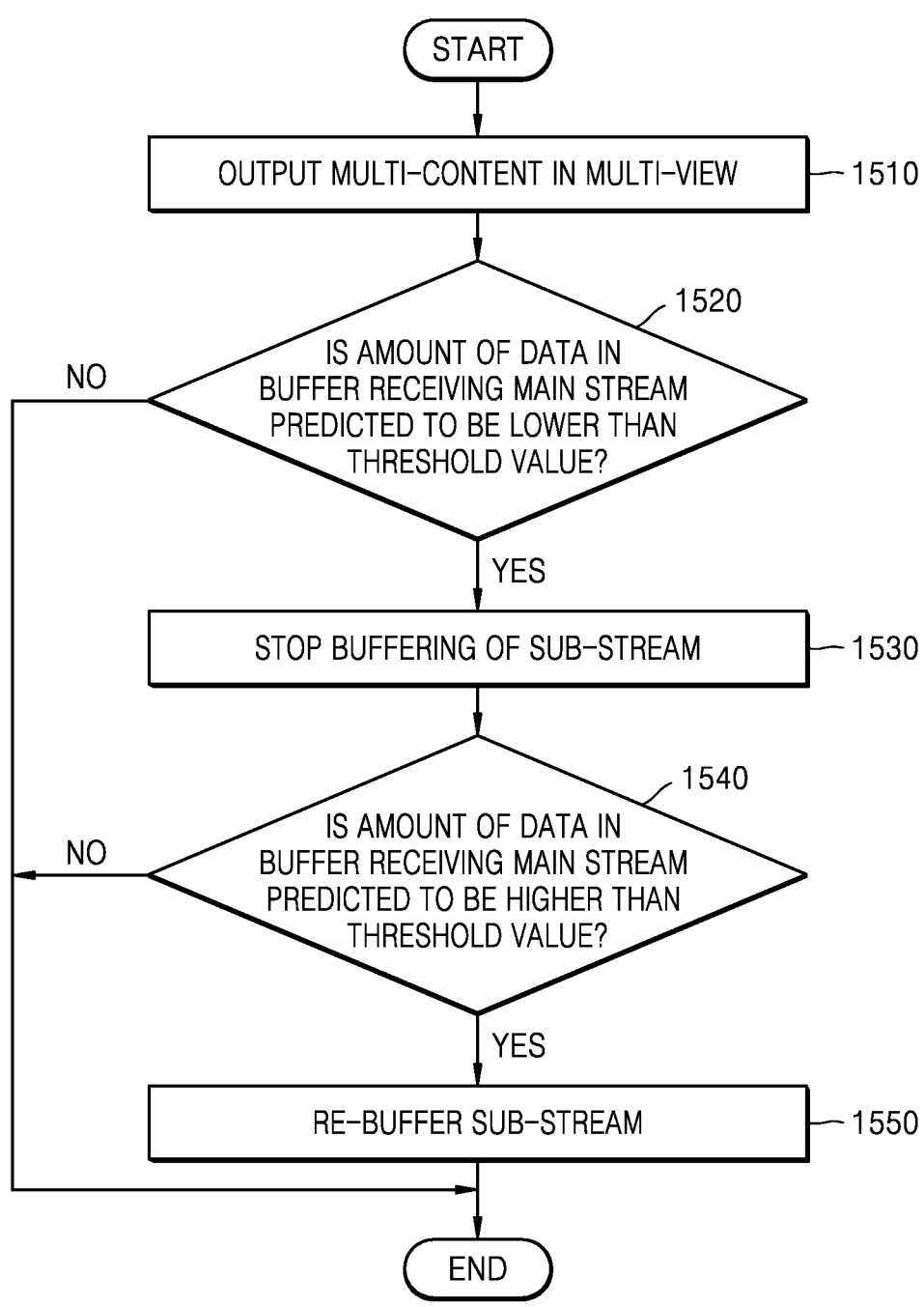
FIG. 15 is a flowchart for describing that an electronic apparatus adjusts buffering of multi-streams during multi-view reproduction, according to an embodiment.

FIG. 15 is a flowchart for describing that an electronic apparatus adjusts buffering of multi-streams during multi-view reproduction, according to an embodiment.

Referring to FIG. 15, the electronic apparatus may obtain multi-content by using multi-streams and output the multi-content in multi-view on the display (operation 1510). Because the electronic apparatus has already obtained and detected the priority identification information for each stream, the electronic apparatus may identify which stream among the multi-streams is a main stream and which stream among the multi-streams is a sub-stream.

The electronic apparatus may determine whether the amount of data in the buffer receiving the main stream is predicted to be lower than a threshold value (operation 1520). That is, when it is predicted that an underflow will occur in the buffer receiving the main stream, the electronic apparatus may stop buffering of the sub-streams having the lower priority than the main stream (operation 1530).

The electronic apparatus may determine whether the amount of data in the buffer receiving the main stream is predicted to be higher than a threshold value after stopping the buffering of the sub-stream because it is predicted that an underflow will occur in the buffer receiving the main stream (operation 1540). That is, according to the state of the network bandwidth or the state of the buffer receiving the main stream, when the amount of data in the buffer receiving the main stream is predicted to be greater than or equal to a certain value, the electronic apparatus may re-buffer the sub-stream that has been stopped from being buffered (operation 1550).

Figure 16:
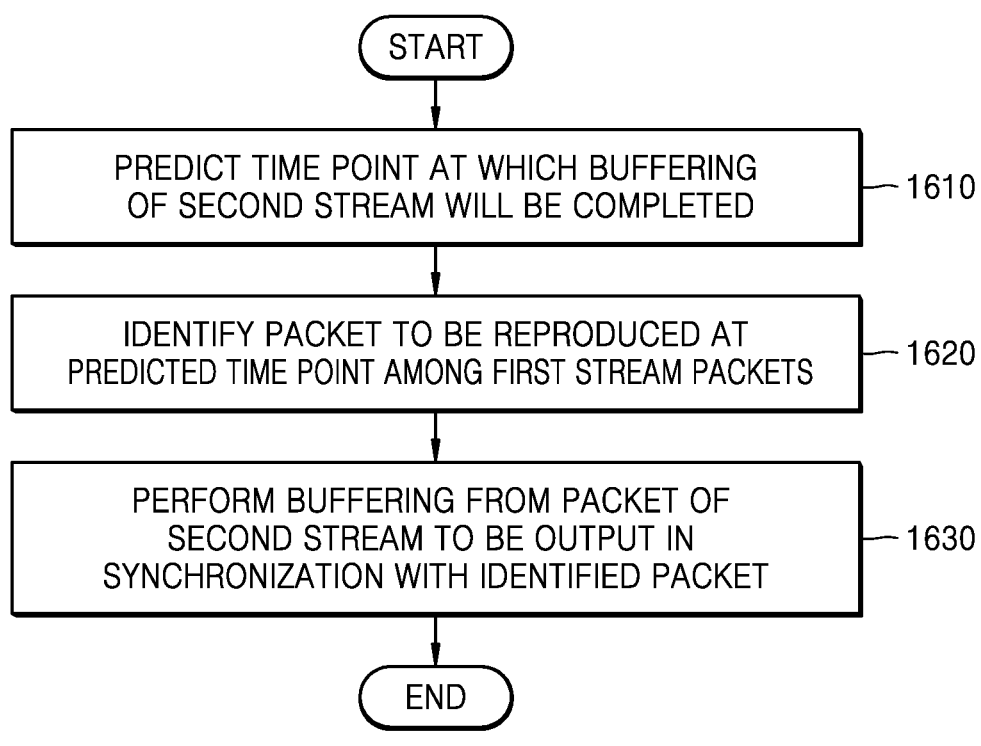
FIG. 16 is a flowchart for describing an operation of FIG. 15 in more detail, according to an embodiment.

FIG. 16 is a flowchart for describing operation 1550 of FIG. 15 in more detail.

Referring to FIG. 16, a case where the electronic apparatus attempts to re-buffer the second stream among the sub-streams that have been stopped from being buffered is illustrated.

The electronic apparatus may predict a time point at which buffering of the second stream will be completed (operation 1610). That is, the electronic apparatus may predict the buffering completion time point of the second stream by considering the time taken until the packets of the second stream are downloaded into the buffer of the second stream by a certain reference value or more and thus data can be read.

The electronic apparatus may identify a packet to be reproduced at a predicted time point among the first stream packets (operation 1620). The electronic apparatus may identify a packet of the second stream to be output in synchronization with the identified first stream packet and may perform buffering from the packet of the second stream (operation 1630). By buffering the second stream as such, the electronic apparatus may synchronize and reproduce the first content and the second content from the predicted time point.

Figure 17:
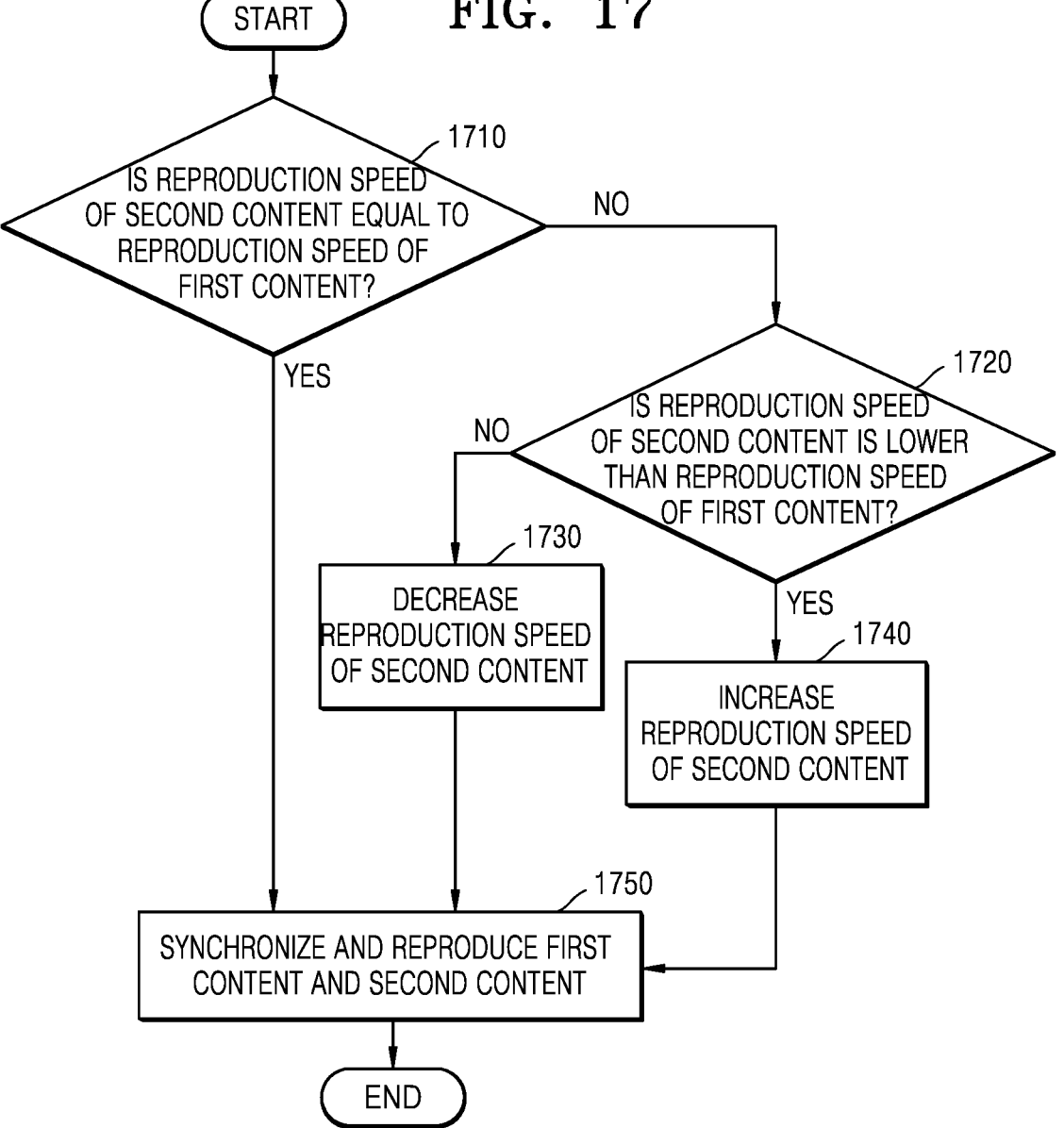
FIG. 17 is a flowchart for describing that an electronic apparatus reproduces pieces of content in synchronization with each other when reproducing the pieces of content in multi-view, according to an embodiment.

FIG. 17 is a flowchart for describing that an electronic apparatus reproduces pieces of content in synchronization with each other when reproducing the pieces of content in multi-view, according to an embodiment.

Referring to FIG. 17, the electronic apparatus may determine whether the reproduction speed of the second content is equal to the reproduction speed of the first content (operation 1710). The electronic apparatus may determine the reproduction speed of the second content, based on whether the second content is being reproduced at a later time point than the first content or whether the second content is being reproduced at an earlier time point than the first content with respect to the current time point.

When determining that the reproduction speed of the second content is different from the reproduction speed of the first content and the reproduction speed of the second content is lower than the reproduction speed of the first content (operation 1720), the electronic apparatus may reproduce the second content at the higher speed (operation 1740). In any one operation or a plurality of operations in the process of reading the second content from the buffer or reading or rendering the same from the decoder, the electronic apparatus may occasionally drop a packet or frame to increase the reproduction speed of the content.

When determining that the reproduction speed of the second content is higher than the reproduction speed of the first content (1720), the electronic apparatus may reproduce the second content at a decreased reproduction speed (operation 1730). When reading the packets of the second stream from the buffer, the electronic apparatus may read the packets at lower speed than the original speed such that the second content may be slow reproduced.

When the reproduction speeds of the second content and the first content are equal to each other or when the reproduction speed of the second content is adjusted to be equal to the reproduction speed of the first content, the electronic apparatus may synchronize and reproduce the first content and the second content (operation 1750).

The electronic apparatus and the operating method thereof according to some embodiments may also be implemented in the form of a computer-readable recording medium including instructions executable by a computer, such as program modules executed by a computer. The computer-readable recording mediums may be any available mediums accessible by computers and may include both volatile and non-volatile mediums and detachable and non-detachable mediums. Also, the computer-readable recording mediums may include computer storage mediums and communication mediums. The computer storage mediums may include both volatile and non-volatile and detachable and non-detachable mediums implemented by any method or technology for storage of information such as computer-readable instructions, data structures, program modules, or other data. For example, the communication mediums may include any information transmission medium and may include other transmission mechanisms or other data of modulated data signals such as computer-readable instructions, data structures, program modules, or carriers.

Also, herein, the "unit" may include a hardware component such as a processor or a circuit and/or a software component executed by a hardware component such as a processor.

Also, an operating method of an electronic apparatus according to an embodiment of the present disclosure described above may be implemented as a computer program product including a recording medium having stored therein a program for implementing an operating method of an electronic apparatus, the operating method including receiving multi-streams, obtaining multi-content from each of the multi-streams, and outputting the multi-content in multi-view by using a plurality of partial screens, wherein the receiving of the multi-streams includes performing adaptive streaming on the multi-streams in consideration of priority between the multi-streams by allocating network bandwidth in descending order of the priority among the multi-streams, and the multi-streams include first to N-th (where N is a natural number equal to or greater than 2) streams in descending order of the priority.

The foregoing descriptions are merely examples, and those of ordinary skill in the art will readily understand that various modifications may be made therein without materially departing from the spirit or features of the present disclosure. Therefore, it is to be understood that the embodiments described above should be considered in a descriptive sense only and not for purposes of limitation. For example, each component described as a single type may also be implemented in a distributed manner, and likewise, components described as being distributed may also be implemented in a combined form.

The invention claimed is:

1. An operating method of an electronic apparatus, the operating method comprising:

receiving multi-streams that include a first to N-th streams in a descending order of priority based on priorities related to the multi-streams, respectively, N being a natural number equal to or greater than 2;

performing adaptive streaming in the receiving to thereby allocate network bandwidth in the descending order of priority starting from a stream having a highest priority among the first to N-th streams based on the priorities related to the multi-streams, respectively;

obtaining multi-content corresponding to the multi-streams; and outputting the multi-content in a multi-view mode so that the multi-content corresponding to the multi-streams is respectively output to a plurality of partial screens, wherein the adaptive streaming comprises:

predicting whether an underflow will occur in a buffer receiving a stream with a higher priority, among a plurality of buffers, and buffering the stream with the higher priority and during the buffering of the stream with the higher priority, simultaneously continuing the buffering of the multi-streams according to a next priority among the multi-streams, based on no occurrence of an underflow being predicted in the buffer receiving the stream with the higher priority, wherein the buffering of the stream with the next priority among the priorities related to the multi-streams comprises:

predicting a time point at which the buffering of the stream with the next priority among the priorities related to the multi-streams is to be completed;

identifying a packet to be reproduced at the predicted time point among packets of the multi-streams; and performing buffering from a packet of the stream with the next priority among the priorities related to the multi-streams to be output in synchronization with the identified packet.

2. The operating method of claim 1, further comprising obtaining additional information about a stream among the multi-streams, wherein the additional information comprises priority identification information representing the priorities related to the multi-streams.

3. The operating method of claim 1, further comprising receiving an input of priority identification information through a user interface.

4. The operating method of claim 1, wherein the adaptive streaming comprises buffering each stream among the multi-streams based on a state of the network bandwidth, a space of the plurality of buffers, respectively, each receiving each stream among the multi-streams, and a bit rate of each stream among the multi-streams.

5. The operating method of claim 1, wherein the buffering comprises, when no occurrence of the underflow is predicted in a first buffer, among the plurality of buffers, respectively receiving each of first to K-th (where K is a natural number greater than or equal to 2 and less than N) streams and occurrence of an underflow is predicted in a second buffer, among the plurality of buffers, receiving a (K+1)th stream, simultaneously buffering the first to K-th streams.

6. The operating method of claim 1, wherein according to the adaptive streaming, no buffering is performed from the stream with the next priority among the priorities related to the multi-streams based on occurrence of an underflow being predicted in the buffer receiving the stream with the higher priority among the priorities related to the multi-streams.

7. The operating method of claim 6, wherein the adaptive streaming further comprises re-buffering the stream with the next priority among the priorities related to the multi-streams based on an amount of data in the buffer receiving the stream with the higher priority among the priorities related to the multi-streams being predicted to be greater than or equal to a certain value.

8. The operating method of claim 1, wherein the time point at which the buffering of the stream with the next priority among the priorities related to the multi-streams is to be completed is a first time point and the outputting of the multi-content in the multi-view mode comprises:

obtaining a second time point at which the multi-content is to be reproduced in synchronization with each other; and adjusting a reproduction speed of content obtained from the stream with the next priority among the priorities related to the multi-streams and synchronizing and reproducing the content with content obtained from a respective stream, from the second time point at which the multi-content is to be reproduced, and the synchronizing and reproducing comprises:

when the reproduction speed of the stream with the next priority among the priorities related to the multi-streams is lower than a reproduction speed of the respective stream, performing buffering while dropping a packet of a slower stream or a frame of the content obtained from the respective stream; and when the reproduction speed of the stream with the next priority among the priorities related to the multi-streams is higher than the reproduction speed of the respective stream, reading a packet of a faster stream slowly from a buffer among the plurality of buffers that is different from the buffer receiving the stream with the higher priority.

9. An electronic apparatus comprising:

a streamer to perform adaptive streaming to thereby allocate network bandwidth in a descending order of priority based on priorities related to multi-streams, respectively, and receive the multi-streams that include a first to N-th streams in the descending order of priority, respectively, N being a natural number equal to or greater than 2;

performing the adaptive streaming in the receiving starting from a stream having a highest priority among the first to N-th streams based on the priorities related to the multi-streams, respectively;

a display;

a memory storing one or more instructions; and a processor configured to execute the one or more instructions stored in the memory, wherein the processor is configured to:

by executing the one or more instructions, obtain multi-content corresponding to multi-streams received through the streamer and control the display such that the multi-content is output in a multi-view mode so that the multi-content corresponding to the multi-streams is respectively output to a plurality of partial screens, wherein the adaptive streaming comprises:

predicting whether an underflow will occur in a buffer receiving a stream with a higher priority, among a plurality of buffers, and buffering the stream with the higher priority and during the buffering of the stream with the higher priority, simultaneously continuing the buffering of the multi-streams according to a next priority among the multi-streams based on no occurrence of an under-flow being predicted in the buffer receiving the stream with the higher priority, wherein the buffering of the stream with the next priority among the priorities related to the multi-streams comprises:

predicting a time point at which the buffering of the stream with the next priority among the priorities related to the multi-streams is to be completed;

identifying a packet to be reproduced at the predicted time point among packets of the multi-streams; and performing buffering from a packet of the stream with the next priority among the priorities related to the multi-streams to be output in synchronization with the identified packet.

10. The electronic apparatus of claim 9, wherein the streamer is configured to obtain additional information about a stream among the multi-streams, wherein the additional information comprises priority identification information representing the priorities related to the multi-streams.

11. The electronic apparatus of claim 9, further comprising a user interface, wherein an input of priority identification information representing the priorities related to the multi-streams is received through the user interface.

12. The electronic apparatus of claim 9, wherein the streamer is configured to:

buffer each stream among the multi-streams based on a state of the network bandwidth, a space of the plurality of buffers each receiving each stream among the multi-streams, and a bit rate of each stream among the multi-streams.

13. A non-transitory computer-readable recording medium having recorded thereon a program for implementing an operating method of an electronic apparatus, the operating method comprising:

receiving multi-streams that include a first to N-th streams in a descending order of priority based on priorities related to the multi-streams, respectively, N being a natural number equal to or greater than 2;

performing adaptive streaming in the receiving to thereby allocate network bandwidth in the descending order of priority starting from a stream having a highest priority among the first to N-th streams based on priorities related to the multi-streams, respectively;

obtaining multi-content corresponding to the multi-streams; and outputting the multi-content in a multi-view mode so that the multi-content corresponding to the multi-streams is respectively output to a plurality of partial screens, wherein the adaptive streaming comprises:

predicting whether an underflow will occur in a buffer receiving a stream with a higher priority, among a plurality of buffers, and buffering the stream with the higher priority and during the buffering of the stream with the higher priority, simultaneously continuing the buffering of the multi-streams according to a next priority among the multi-streams, based on no occurrence of an under-flow being predicted in the buffer receiving the stream with the higher priority, wherein the buffering of the stream with the next priority among the priorities related to the multi-streams comprises:

predicting a time point at which the buffering of the stream with the next priority among the priorities related to the multi-streams is to be completed;

identifying a packet to be reproduced at the predicted time point among packets of the multi-streams; and performing buffering from a packet of the stream with the next priority among the priorities related to the multi-streams to be output in synchronization with the identified packet.

* * * * *